US012080187B1

(12) United States Patent  
Ferrucci et al.

(10) Patent No.: US 12,080,187 B1  
(45) Date of Patent: Sep. 3, 2024

(54) INFORMATION AND DIALOG MODELS FOR EDUCATION

(71) Applicant: Elemental Cognition Inc., Westport, CT (US)

(72) Inventors: David Ferrucci, Wilton, CT (US); David Melville, Boiceville, NY (US); Gregory Burnham, Brooklyn, NY (US)

(73) Assignee: Elemental Cognition Inc., New York, NY (US)

( * ) Notice: Subject to any disclaimer, the term of this patent is extended or adjusted under 35 U.S.C. 154(b) by 1622 days.

(21) Appl. No.: 16/047,975

(22) Filed: Jul. 27, 2018

(51) Int. Cl.
- *G09B 7/04* (2006.01)
- *G06F 40/30* (2020.01)
- *G09B 7/00* (2006.01)
- *G06N 20/00* (2019.01)

(52) U.S. Cl.
CPC .............. *G09B 7/04* (2013.01); *G06F 40/30* (2020.01); *G09B 7/00* (2013.01); *G06N 20/00* (2019.01)

(58) Field of Classification Search
CPC .. G09B 7/04; G09B 7/00; G06F 40/30; G06N 20/00
See application file for complete search history.

(56) References Cited

U.S. PATENT DOCUMENTS

| | | | | |
|---|---|---|---|---|
| 2004/0117189 A1* | 6/2004 | Bennett | ................ | G10L 15/30 704/E15.04 |
| 2015/0072330 A1* | 3/2015 | Rosenberg | ............ | G09B 19/00 434/362 |
| 2015/0170536 A1* | 6/2015 | Lan | ........................ | G06N 20/00 434/350 |
| 2016/0117954 A1* | 4/2016 | Dumchev | ............... | G06F 40/30 434/157 |
| 2016/0125751 A1* | 5/2016 | Barker | ................ | G06F 16/9535 434/322 |
| 2016/0180728 A1* | 6/2016 | Clark | ........................ | G09B 7/00 434/362 |
| 2016/0292593 A1* | 10/2016 | Agarwalla | ............. | G06N 20/00 |
| 2017/0154543 A1* | 6/2017 | King | ........................ | G09B 7/02 |
| 2017/0371861 A1* | 12/2017 | Barborak | ................ | G06F 40/35 |
| 2018/0218627 A1* | 8/2018 | Smith Lewis | ........... | G09B 7/08 |
| 2018/0373702 A1* | 12/2018 | Wang | ........................ | G09B 7/04 |
| 2018/0373791 A1* | 12/2018 | Yen | ........................... | G09B 7/04 |

(Continued)

*Primary Examiner* — Timothy A Musselman  
(74) *Attorney, Agent, or Firm* — Lee & Hayes, P.C.

(57) ABSTRACT

A reading comprehension system may include an authoring tool to help generate adaptable dialogs and a reading tool to conduct adaptable dialog sessions with students. The authoring tool may receive and process stories to generate labeled stories and information models. The information models may provide the conceptual structures that an effective reader should build while reading and understanding a story. The system may use dialog models for general dialogs and information models for story specific dialogs to guide adaptable dialog sessions with students. During the adaptable dialog sessions, the system may constantly assess and guide the student's progress in the understanding the current story and in general reading comprehension development. Using the labeled stories and dialog sessions as training data, the system may learn how to dialog effectively with the students, to gather an evolving understanding of the student's abilities, and to acquire knowledge about the world or the story.

20 Claims, 14 Drawing Sheets

(56) References Cited

U.S. PATENT DOCUMENTS

| | | | |
|---|---|---|---|
| 2019/0180639 A1* | 6/2019 | Dechu | G09B 7/00 |
| 2019/0236146 A1* | 8/2019 | Niekrasz | G06N 20/20 |
| 2019/0318648 A1* | 10/2019 | Zhang | G06N 3/08 |
| 2019/0325771 A1* | 10/2019 | Ghatage | G06F 1/163 |

* cited by examiner

The Winning Shot
The soccer game was nearly over. Time had almost run out. The two teams were tied, one to one.
Alice kicked the ball.
Oh no! She kicked it the wrong way. She kicked it toward the school building.
"What a bad kick," Alice thought.
But wait! One of her teammates, John, jumped to stop the ball. The ball went off John and into the goal!
Hooray! It was not a bad kick, after all.
Alice's team won the game.

The soccer game was nearly over. Time had almost run out
<event><temporal><idiom>
The two teams were tied, one to one.
<state>
Alice kicked the ball.
<character_intro><event_character><element_intro><spatial>
Oh no! She kicked it the wrong way.
<opinion_author><event_character>
"What a bad kick," Alice thought.
<opinion_character><event_character>
She kicked it toward the school building.
<event_character><element_intro>
But wait! One of her teammates, John, jumped to stop the ball.
<character_intro><relationship_character><event_character>
The ball went off John and into the goal!
<event_character>
Alice's team won the game.
<event>
Hooray! It was not a bad kick, after all.
<opinion_author><moral>

Information Model

TEMPORAL
[*i*] When did the story occur?
 - [information] The story occurred near the end of the soccer game
 - [evidence] The story says, "The soccer game was nearly over"

CHARACTERS
[*i*] Who were the characters?
 - Alice and John
[*i*] How did Alice feel when she kicked the ball the wrong way?
 - [information] She felt she had done something wrong
 - [evidence] She thought "What a bad kick"
[*i*] How did Alice's feelings change during the story?
[*i*] What relationship does Alice have to John?
 - [information] Alice is John's teammate
 - [evidence] "One of her teammates, John"

AUTHOR
[*i*] Whose side do you think the author is on?
 - [information] the author is on Alice's side
 - [evidence] The author writes "Oh no!" when Alice does something wrong

SUMMARY
Near the end of the soccer game, Alice did a bad kick, but it was ok because John jumped to stop the ball and it went in the goal. They won the game

MORAL
 - "Never give up"

FIG. 8

The Winning Shot
The soccer game was nearly over. Time had almost run out. The two teams were tied, one to one.
Alice kicked the ball.
Oh no! She kicked it the wrong way. She kicked it toward the school building.
"What a bad kick," Alice thought.
But wait! One of her teammates, John, jumped to stop the ball. The ball went off John and into the goal!
Alice's team won the game. Hooray! It was not a bad kick, after all.

The soccer game was nearly over. Time had almost run out
<Event1><Temporal1><Idiom1>
The two teams were tied, one to one.
<State1>
Alice kicked the ball.
<Character1_Intro><Event2_Character1><Element1_Intro>
<Spatial1_Character1_Element1>
Oh no! She kicked it the wrong way.
<Opinion1_Author><Event3_Character1>
She kicked it toward the school building.
<Event4_Character1><Element2_Intro>
"What a bad kick," Alice thought.
<Opinion2_Character1><Event5_Character1>
But wait! One of her teammates, John, jumped to stop the ball.
<Character2_Intro><Relationship1_Character1_Character2><Event6_Character2>
The ball went off John and into the goal!
<Event7_Character2>
Alice's team won the game.
<Event8>
Hooray! It was not a bad kick, after all.
<Opinion3_Author><Moral>

Information Model

TEMPORAL
[+] When did the story occur?
- [information] The story occurred near the end of the soccer game
- [evidence] <Temporal1> "The soccer game was nearly over"
[+] Timeline sequence of events in the story
- <Event1> Game was nearly over, the two teams were tied
- <Event2_Character1> Alice kicked the ball
- <Event3_Character1> Alice kicked the ball the wrong way
- <Event4_Character1> The ball went toward the school
- <Event5_Character1> Alice thought it was a bad kick
- <Event6_Character2> John jumped to stop the ball
- <Event7_Character2> The ball hit John and went into the goal
- <Event8> Alice's team won the game.
[-] What was the most important event and why?

SPATIAL
[-] Where did the story take place?
[-] What was the spatial relationship between <Character1> and <Element1> when <Event2_Character1> occurred?

CHARACTERS
[+] Who were the characters?
- [information] Alice, John
- [evidence] <Character1><Character2>
[+] How did <Character1> feel when <Event3_Character1> happened?
[+] What relationship does <Character1> have to <Character2>?
- [information] Alice is John's teammate
- [evidence] <Relationship1_Character1_Character2> "One of her teammates, John"

INFORMATION AND DIALOG MODELS FOR EDUCATION

BACKGROUND

Teaching children reading comprehension is challenging on many levels. One key component of understanding language is having the background knowledge to grasp the implied meaning behind the words. Younger children may not possess the background knowledge needed to understand the implied meaning of words. Depending on family background and the extent to which they were read to at home, the difference in reading levels between younger students may be more apparent. Additionally, at a younger age, a child's attention span can be an issue and additional positive reinforcement may be needed to improve the child's focus. The ability to speak with students having varying levels of reading comprehension skills, while also providing sufficient positive feedback to keep them engaged, requires individualized attention from the teacher. An effective teacher needs to be able to have different discussions with different students based on the student's aptitude. Where appropriate, an effective teacher may refer to stories previously read by that student in order to help the student better understand a similar point associated with current reading material. Such individualized attention may not only keep the student engaged, but may also help the student improve at identifying themes or morals that are important for personal growth. However, the ratio of teachers to students in a typical classroom setting may not always be conducive to providing a sufficient amount of individual guidance. While children from a higher socioeconomic background may have access to individualized reading comprehension lessons outside of school, not all children have similar access. To fill this gap, educational software may be leveraged to provide some equality in access.

Although most students may already be interacting with computing devices for additional reading comprehension tutorials, such tutorials are traditionally filled with linear questions and multiple-choice answers. As such, these traditional tutorials may feel more like a tedious chore and a far cry from a lively discussion with an effective teacher. Accordingly, there is an ongoing need for more intelligent computing devices that can engage and educate the students through more intelligent dialogs.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 illustrates one implementation of select components that may be used to syntactically process a text string, from a story, to produce linguistic analysis results.

FIG. 4 illustrates select components that may be used to semantically process the linguistic analysis results of the story.

FIG. 5 illustrates select components in the dialog module that generate user questions to challenge or validate the reading comprehension system's current understanding of the story, and receive user responses for updating the system's understanding.

FIG. 8 is a schematic diagram showing an example authoring tool user interface that may be presented to an author in order to add dialogs.

FIG. 9 is a schematic diagram showing an example authoring tool user interface that may be presented to an author with an information model having a pre-populated dialog.

FIG. 11 is a schematic diagram showing an example reading tool user interface that facilitates an adaptable dialog with a student.

DETAILED DESCRIPTION

Figure 1:
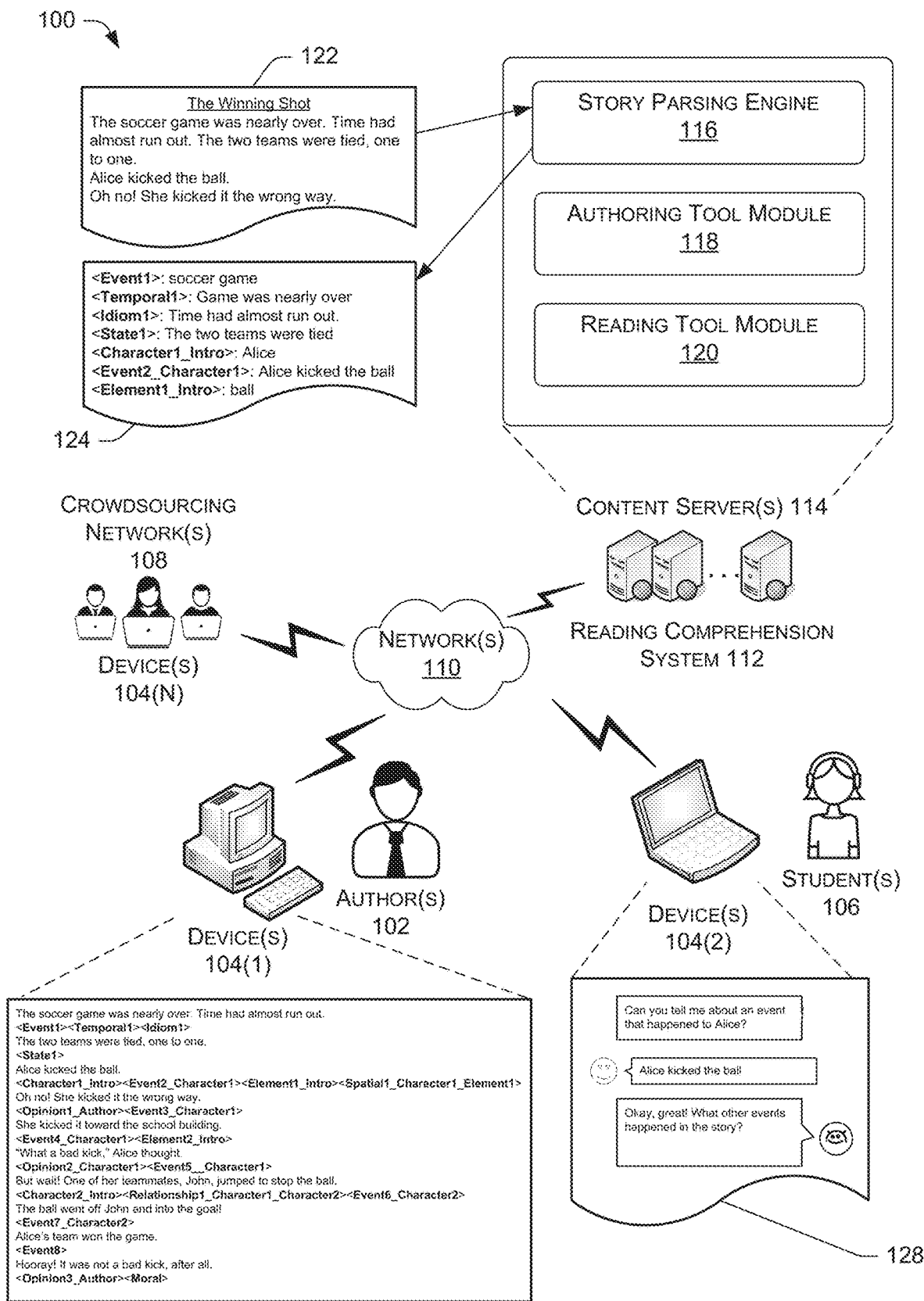
FIG. 1 is a schematic diagram showing an example system for using an authoring tool to help generate an adaptable dialog and using a reading tool to interact with the system during an adaptable dialog session.

This disclosure is directed, in part, to a reading comprehension system with an authoring tool that generates information models to guide dialog sessions, and a reading tool to learn about, and from, the student through the dialog sessions. The authoring tool may be used to generate information models, or models of the information extracted from stories, and the system may use these information models to conduct adaptable dialog sessions with students. By using these information models to guide the dialog, the system may simulate a teacher having an effective dialog with a child. That is, similar to a teacher, who may have different discussions with different students, the system may adapt the dialog based on the responses of the students. Also, similar to a teacher, the system may constantly assess the student's understanding of the current reading and skills that may need development. If, during the assessment, the system determines that the student lacks the reading comprehension skills to understand the story, the system may adapt the dialog to work on the needed skills. The system may learn how to dialog effectively with the students, to gather an evolving understanding of the student's abilities, and to acquire knowledge about the world or the story. To help the system acquire this knowledge, the system may ask the students for information that the system did not know during a dialog session, but that the system learned from aggregating the students' answers/responses.

Before the system determines what information it should ask, the system may first receive one or more stories and tag story elements to generate information models of the stories. An information model may provide the conceptual structures that an effective reader should build while reading and understanding a story. Using a dialog model as a general dialog guide, and an information model as a story specific dialog guide, the system may present dialogs that are responsive to the student's answer, while guiding the student to a better understanding of the story.

The present reading comprehension system aims to simulate a very patient teacher, who is willing to take the time and energy to engage in a longer conversation journey with a student towards understanding the story. Each step may constitute a "small dialog" that is intended to lead the student to the main destination or goal, which may be learning about the theme or moral of the story. To do this, the system may first construct a "dialog map" of each process that may be implemented to achieve the goal and to highlight key steps that are to be taken to achieve the goal. This teaching system should consider the current status or level of the student, determine which steps are to be taken to achieve the goal, and to take these steps with the student. If it is determined that a student is struggling to achieve such goals, the system may continue to guide the student by providing positive feedback and then segue the dialog back to the primary goal (e.g., identify story elements or structure, improve vocabulary or other skills, develop reading skills, etc.).

This reading comprehension system may be accessible by authors (e.g., teachers, tutors, writers, etc.) and students via a web portal or application. The authors may interact with an authoring tool portion of the reading comprehension system to provide stories and tag different portions of the stories with scripted dialogs. In response to receiving a story from an author, the system may first parse the story and tag story elements with labels that a parsing engine may recognize using early system story models. That is, upon receiving a story, the system begins labeling the roads, or story elements, as part of constructing a dialog map. To be able to effectively segue dialogs, or lead the conversation back to a primary goal, the system needs to construct a dialog map that identifies and considers steps that a student may take that are inconsistent with the primary goal. In creating this dialog map, the parsing engine may start by identifying characters of the story, then identifying events based on actions taken by the characters, and then generating an initial information model of the story. This initial information model may be a rough dialog map, but may still be able to further the conversation towards the primary goal. Early in the learning phase, the parsing engine may present a simple marked-up version of the story for the author to confirm and possibly provide additions. That is, the system may construct a preliminary dialog map, where the author may then add details and dialogs to the preliminary dialog map. With the preliminary dialog maps, the authors may need to provide a significant amount of the dialogs, with scripted questions and answers. More importantly, the authors may need to initially provide the primary goal. However, the system learns from the author's additions. As the system story model is trained with data gathered by the authoring tool, the system may present a more sophisticated marked-up, or tagged, version of the story. Additionally, the information model generated by the more sophisticated tagged-stories may also include more sophisticated dialogs learned from the authors.

Using the information model as dialog map, the system may present micro-dialogs, or small dialogs, focused on gaining minor pieces of information from the story. This minor piece of information may help lead the dialog toward the primary goal. Although the micro-dialogs may be used to simulate an actual teacher gently guiding the student towards a better understanding of the story, the micro-dialogs may also be used for skill development, such as vocabulary development. That is, the system may constantly assess the student and, from time to time, recognize that the student does not actually have the skill to reach the current goal. When this happens, the system may reassess the immediate goal and adjust the goal to teaching the necessary skill to the student prior to continuing to achieve the primary goal.

In constructing the dialog map, the system may generate and pre-populate a list of micro-dialogs for a story and the list of generated micro-dialogs may be presented to the author for verification. Additionally, the system may prompt the author to add questions related to the labeled elements and provide any missing information to the information model. The author may edit the labeled elements and add scripted questions and answers. Following the author's edit(s), the system may store the updated information model for the story.

The students may interact with the reading tool portion of the reading comprehension system to read stories and to dialog with the system. Although some introduction and closing micro-dialogs may follow a more rigid dialog path, the micro-dialogs are generally presented to the student based on the student's answers. The student may have an associated student account and the student's associated user data and model may be stored in association with the student account. The student user data may allow the system to not only understand the student's strengths and weaknesses but may also be leveraged by the system to tailor the lessons or story dialogs to the student's needs or skill levels.

In some examples, the information model of the story may still have gaps in its knowledge and understanding of the story. The system may generate questions to help fill in these gaps. The responses from a pool of students may be aggregated and analyzed to discard outlier responses, and the accepted responses may be used to update the information model for the story and to adjust the system's understandings of the story. After revising the information model, the new understanding may further be tested through additional dialog with students.

This reading comprehension system provides a number of advantages over the traditional reading comprehension systems, such as allowing faster additions of new stories to the system. The authoring tool, even in early learning stage, parses the input stories and may provide simple dialogs to inquire about characters and events. Thus, the author can focus his/her energy on adding the more complicated dialogs. Moreover, the system has a dialog model in place to conduct small dialogs outside of the primary goal, which allows for nonlinear dialog to better engage a student.

Additionally, the authoring tool provides an improvement over how traditional supervised training data is acquired, which may require a developer to label the training data based on what the developer believes is the correct labeling. By providing the authoring tool, the system is able to continuously gather training data and learn from the training data, so that in the early stages of the system, the authoring tool may help gather supervised training data, or labeled data, much faster than having developers create and tag the many stories. The process of authoring a number of stories and labeling each story is not only time intensive and resource intensive (e.g., higher costs), but any adjustments to labeling is similarly slow and costly. However, by making the authoring tool available to teachers and educators, who engage students in conversations on a daily basis and have a better understanding of the more nuanced questions to ask younger students, the training data is more appropriately labeled by the authors with the tool's tagging process. Additionally, data adjustments can be quickly made by the authors with the authoring tool. Over time, based on the stories, labels, and dialogs gathered from authors, the machine can learn to independently tag and generate dialogs for the stories and may require only mere confirmation from the authors. As such, as the system learns, the story tagging process is faster, more efficient, and even more accurate than tagging stories manually.

Moreover, by creating a system that can quickly tag and generate dialogs for the stories without additional input from authors, the library of stories may grow more rapidly. This growth allows for greater variety of topics in stories to better engage readers who may enjoy a different variety of topics. Thus, the present reading comprehension system provides improvement over traditional reading comprehension systems by providing a faster, more efficient, and less costly method to generate dialogs for, and adding stories to, the database. Finally, rather than remaining stagnate as a traditional reading comprehension system that relies on manually generated linear questions, the present system may learn and evolve to read more complex stories over time and teach more complicated stories. By learning and evolving, the present system's ability to teach and understand stories may continue to improve over time.

This system employs techniques from artificial intelligence, such as knowledge representation and machine learning. In addition, it employs techniques from natural language processing, such as, syntactic parsing, predicate argument structure, entity type assignment, co-reference analysis, and statistical techniques such as distributional semantics (e.g. latent semantic analysis, random indexing and topic modeling).

The techniques and systems described herein may be implemented in a number of ways. Example implementations are provided below with reference to the following figures.

Illustrative Environment

FIG. 1 is a schematic diagram showing an example system 100 for an author using the authoring tool to help generate adaptable dialog and a student using the reading tool to interact with the system in an adaptable dialog session. The system 100 may include author(s) 102, student(s) 106, and crowdsourcing network(s) 108 that utilizes computing devices 104(1)-104(N) (individually and/or collectively referred to herein as "computing device(s) 104"), where N is any integer greater than and/or equal to 2, through one or more network(s) 110, to interact with a reading comprehension system 112. In some examples, the network(s) 110 may be any type of network known in the art, such as the Internet. Moreover, the reading comprehension system 112 and/or the device(s) 104 may communicatively couple to the network(s) 110 in any manner, such as by a wired or wireless connection.

The reading comprehension system 112 may be any entity, server(s), platform, etc., that makes educational software available to authors 102, students 106, and crowdsourcing network(s) 108. In some embodiments, the reading comprehension system 112 may provide authoring tools for authors 102 to add stories for students 106 to learn from. Additionally, the reading comprehension system 112 may also provide a reading tool for students 106 to read the stories and interact with the reading comprehension system 112 through dialog. As shown, the reading comprehension system 112 may include one or more content server(s) 114. The content server(s) 114 may be implemented in a non-distributed computing environment or may be implemented in a distributed computing environment, possibly by running one or more modules on devices 104 or other remotely located devices. The content server(s) 114 may be any type of server, such as a network-accessible server.

In various examples, the reading comprehension system 112 may present the tools and stories on behalf of the authors 102, educational services, and/or entities. In at least one example, the reading comprehension system 112 described herein may cause one or more user interfaces to be presented to authors 102, students 106, and members of the crowdsourcing network(s) 108 (collectively referred to herein as "users") via devices 104. The user interface(s) may allow both the users to create user accounts to access the system, among other possible uses. In some examples, the reading comprehension system 112 may present specific stories to students 106, who may be students 106 of the author 102. That is, the reading comprehension system 112 may allow authors 102 (e.g., teachers, schools, and/or teaching entities) to provide specific stories to specific students 106 as part of a class curriculum.

In some examples, the reading comprehension system 112 may include the authoring tool module 118 to allow authors 102 to submit stories to the system. The story parsing engine 116 may parse the submitted story and present a tagged version of the story for the author to confirm and/or further modify utilizing the authoring tool module 118. Following confirmation by the author, the tags in the story allow the reading comprehension system 112 to generate an adaptable dialog for story. The reading tool module 120 may present the story to the student(s) 106 and proceed to have a dialog with the student(s) 106 to help the student(s) 106 have a better understanding of the story.

The authors 102 (e.g., teachers, tutors, educators, parents, approved users, etc.), students 106 (e.g., students 106 at a school, learning centers, home, etc.), and members of the crowdsourcing network(s) 108 may interact with the reading comprehension system 112 via a site (i.e., a website), an education application, a self-service interface, a self-service portal, or in any other manner.

The authors 102 may use the authoring tool module 118 to interact with the reading comprehension system 112. In various examples, the authors 102 may be any individuals, teachers, staff, or entities that are providers and/or editors of stories or reading content. For instance, the authors 102 may include entities such as a learning center with multiple instructors and staff members registered to add and/or edit content under one or more accounts associated with an entity. Additionally, the authors 102 do not have to contribute their own stories or original content, but rather, the authors 102 may provide edits and tags to existing stories or content in the story database. The authoring tool module 118 may generate and present user interfaces to prompt the author 102 to upload and/or edit content. For the purpose of this discussion, such user interfaces are referred to herein as an "Authoring Tool UI." The Authoring Tool UI may display stories with elements tagged to allow the author to edit questions and dialogs, as well as to add graphical elements to help illustrate points being made, as illustrated and discussed in FIGS. 4 and 5, below:

Initially, the reading comprehension system 112 may select authors 102 who create content for younger children to train early models on lower level reading content, or shorter stories with more simple concepts and short sentences. As the reading comprehension system 112 learns from early works, the authors 102 of higher level reading content may be introduced gradually over time.

The students 106 may interact with the reading comprehension system 112 to work on reading skills through stories and dialogs using the reading tool module 120. In some examples, the reading tool module 120 may present user interfaces to prompt the students 106 to read stories or portions of stories and discuss the content. For the purpose of this discussion, such user interfaces are referred to herein as a "Reading Tool UI." The Reading Tool UI may display stories or portions of a story and prompt the student(s) 106 to discuss the reading material, as well as present graphical elements to help illustrate points being made, as illustrated and discussed in FIG. 7, below.

In some examples, the users, authors 102 and students 106, may operate corresponding devices 104 to perform various functions associated with the devices 104, which may include at least some of the operations and/or modules discussed above with respect to the reading comprehension system 112. The users may operate devices 104 using any input/output devices including but not limited to mouse, monitors, displays, augmented glasses, keyboard, cameras, microphones, speakers, and headsets. In various examples, the reading comprehension system 112 and/or the devices 104 may include a text-to-speech module that may allow the reading comprehension system 112 to conduct a dialog session with the students 106 by verbal dialog.

In at least one configuration, the content server(s) 114 may include any components that may be used to facilitate interaction between the reading comprehension system 112 and the devices 104. For example, the content server(s) 114 may include a story parsing engine 116, the authoring tool module 118, and a reading tool module 120.

The story parsing engine 116 may interact with the authoring tool module 118 to receive stories or reading content from the authors 102 (e.g., teachers, writers, educators, etc.). The story parsing engine 116 may use one or more machine learning story models to process the unedited stories to identify the elements and the element types (e.g., characters, objects, setting, and events, etc.) in the story. Having identified the elements, the story parsing engine 116 may tag the elements with labels to generate a tagged version of the stories. These labels may be generated based on any label naming convention that allows the reading comprehension system 112 to reference the tagged element. For instance, the example tagged-story 124 may use "enumerated label," but this system may also use labels generated by any label naming convention. In at least one example, the labels may include an element type, based on the element being tagged, and include an enumerated value that increments based on the element type (e.g., for each new character, object, and event). Such enumerated labels may uniquely reference the tagged portion of the story.

The authoring tool module 118 may present a user interface for the author(s) 102 to interact with the system. Through the authoring tool module 118, the author may upload stories and edit stories to provide scripted dialogs for understanding the story. As described above, the authoring tool module 118 may interact with the story parsing engine 116 to initially process the stories to tag the elements with enumerated labels. Additionally, the authoring tool module 118 may allow the authors 102 to edit the tags and script, and/or add additional tags and script. For instance, the author(s) 102 may enjoy writing and editing stories that have very definite points of "conflict" and "resolution," and if the system does not have such an element type, the author may add <event_conflict> and <event_resolution> as a new label. Over time, with sufficient training data from the authors 102, the system may learn how to incorporate the new element type and label the element correctly. As the system is introduced to authors 102 of stories of higher reading level gradually over time, the system may also gradually learn new element types that were created by the authors 102 to properly label the more complicated stories.

By identifying the element types as used in the enumerated labels, the authoring tool module 118 may pre-populate a collected list of possible micro-dialogs generated for the story. This collected list may be presented by the authoring tool module 118 as a selectable drop-down list and the authoring tool module 118 may prompt the author to select one or more questions from a collected list. The authoring tool module 118 may also allow the author to create entirely new questions with or without the enumerated labels. Following the selection or creation of the question, the author may be prompted to provide the answer and link to the evidence within the story. In some examples, the authoring tool module 118 may create a dropdown list of the enumerated labels for the author to select as evidence for answers to questions. Additionally, and/or alternatively, the information model may provide the answers to the questions that it knows.

In additional examples, the authoring tool module 118 may present a visual editing tool for the author to add illustrations and other visual elements to help engage the reader or illustrate a point. The visual editing tool may present an empty stage with illustrations that may be useful based on the characters, settings, events, and/or objects identified.

The reading tool module 120 may provide reading comprehension content to a student 106. Following a presentation of a story or reading content, the reading tool module 120 may conduct a dialog with the student(s) 106 to help the student(s) 106 understand the reading. Such dialog may be adaptable to the responses of the student. The reading tool module 120 may highlight important elements in the story and provide illustrations to help guide the student(s) 106 to a better understanding of the story.

The crowdsourcing network(s) 108 may include any number of human collaborators who are engaged by the devices 104 to interact with the reading comprehension system 112 and verify the functions of one or more modules of the reading comprehension system 112. For instance, a human collaborator of the crowdsourcing network(s) 108 may interact with the reading tool module 120 and may be provided reading comprehension content to verify that the content was appropriate for a hypothetical student. Additionally, the human collaborator of the crowdsourcing network(s) 108 may be asked to provide background information for stories or verify answers for questions generated by the reading comprehension system 112. The crowdsourcing network(s) 108 may include formal collaborators or untrained individuals who simply answer questions posed by the devices 104. In one implementation, the crowdsourcing network(s) 108 may be part of an organized crowdsourcing network(s) 108, such as the Mechanical Turk™ crowdsourcing platform.

As a non-limiting example, the author(s) 102 may provide an example story 122 to the example system. The story parsing engine 116 may process the example story 122 and present an example tagged-story 124 for the author to verify and to provide additional edits if necessary. The example tagged-story 124 provides the story of "The Winning Shot" and an example tagging the identified elements with example enumerated labels follows:

The soccer game was nearly over. Time had almost run out.
<Event1>: soccer game
<Temporal 1>: game was nearly over
<Idiom1>: "Time had almost run out."
The two teams were tied, one to one.
<State1>: two teams were tied
Alice kicked the ball.
<Character1 Intro>: Alice
<Event2 Character1>: Alice kicked the ball
<Element1_Intro>: the ball
<Spatial1_Character1_Element1>: Alice was touching distance from the ball
Oh no! She kicked it the wrong way.
<Opinion1_Author>: "Oh no!"
<Event3 Character1>: Alice kicked the ball the wrong way
She kicked it toward the school building.
<Event4 Character1>: Alice kicked the ball toward the school building
<Element2 Intro>: the school building
"What a bad kick," Alice thought.
<Opinion2_Character1>: "What a bad kick."
<Event5_Character1>: Alice thought it was a bad kick
But wait! One of her teammates, John, jumped to stop the ball.
<Character2_Intro>: John
<Relationship1_Character1_Character2>: Alice is John's teammate
<Event6_Character2>: John jumped to stop the ball
The ball went off John and into the goal!
<Event7 Character2>: the ball hit John and went into the goal
Alice's team won the game.
<Event8> Alice's team won the game
Hooray! It was not a bad kick, after all.
<Opinion3_Author>: Hooray!
<Moral>: Never give up!

The example enumerated labels as presented merely represent one example of how the story elements may be tagged and how the enumerated type may be used. In an actual computing device environment, the elements may be tagged by other labeling system including color labels. Here, the example tagged-story 124 includes enumerated labels for the elements including labeling Alice as "Character1" and John as "Character2." Following a complete edit from the author, the authoring tool module 118 may process the edited story to generate an updated information model for the story. The updated information model for the story may be used to provide example dialog session 126 with the student 106.

Figure 2:
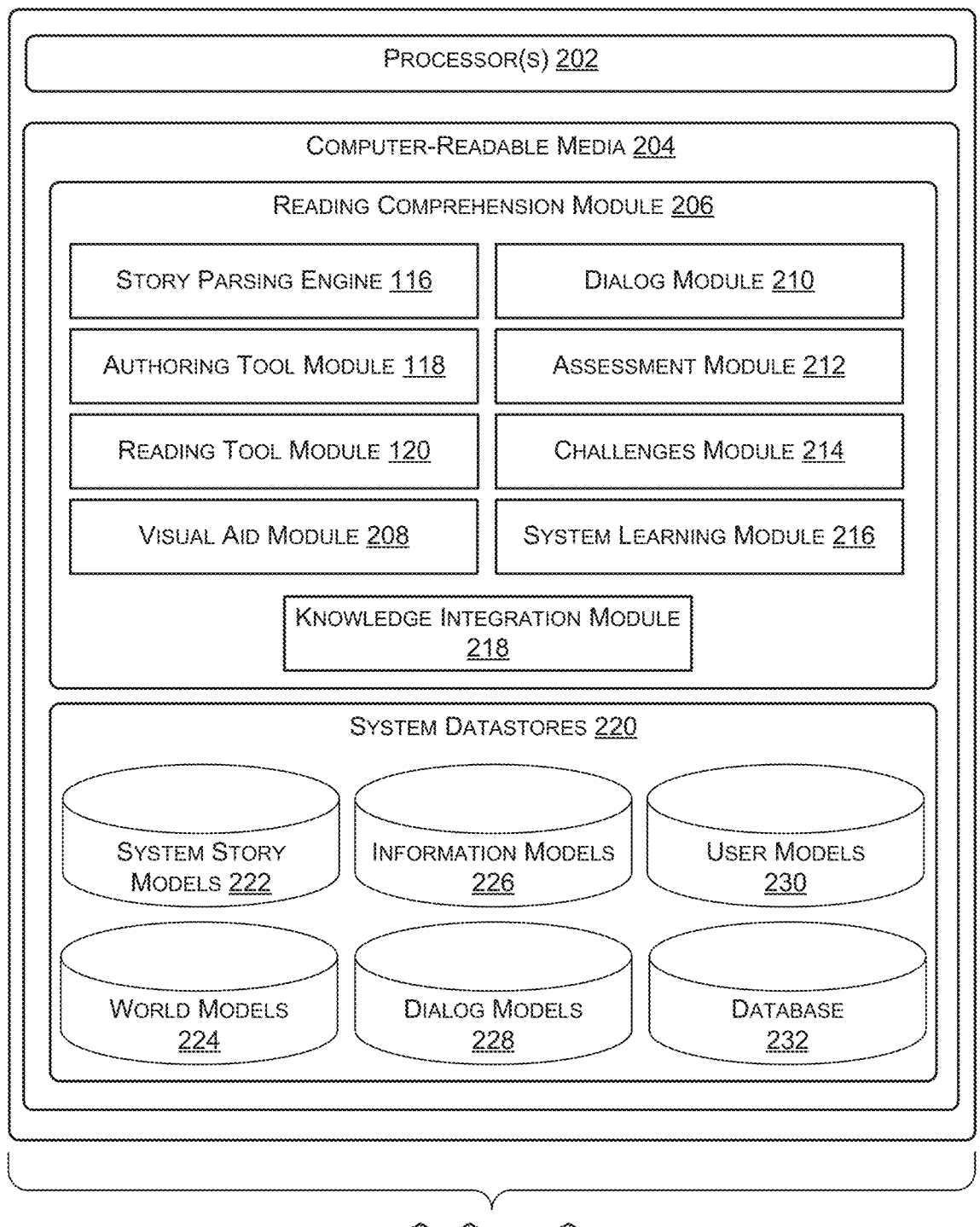
FIG. 2 is a block diagram of an illustrative computing architecture of a reading comprehension system using machine learning models.

FIG. 2 is a block diagram of an illustrative computing architecture 200 of the content server(s) 114. The computing architecture 200 may be implemented in a distributed or non-distributed computing environment.

The computing architecture 200 may include one or more processors 202 and one or more computer-readable media 204 that stores various modules, data structures, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media appropriate for storing electronic instructions. In addition, in some embodiments the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

In some embodiments, the computer-readable media 204 may store the reading comprehension module 206 and associated components, and the system datastores 220) and associated components, which are described in turn. The components may be stored together or in a distributed arrangement.

The reading comprehension module 206 may include the story parsing engine 116, the authoring tool module 118, the reading tool module 120, the visual aid module 208, the dialog module 210, the assessment module 212, the challenges module 214, and the system learning module 216. The reading comprehension system's goal is to learn how to dialog effectively with the student, gather an evolving understanding of the student's abilities, and to acquire knowledge about the world or the story. To this end, the reading comprehension module 206 may leverage its components and models in the system datastores 220 to build and evolve the system's world knowledge and story model. The reading comprehension module 206 may collect data associated with users from various source and retrieve user data as needed by the modules, including data specific to the user accounts including tools permission (e.g., full access to authoring tool, edit-only access to authoring tool, full access to reading tool, etc.), personal user data (e.g., age, gender, hobbies, affiliations with teaching entities, etc.), and user model (e.g., author user models and student user models). In various examples, the reading comprehension module 206 and/or one or more associated components may be part of a standalone application that may be installed and stored on the user devices 104.

The story parsing engine 116 may process stories and generate information models for the stories. An effective information model may provide the conceptual structures that represents an understanding of the story, where the information extracted is connected to the evidence within the story. The information model for each story provides a dialog map leading to a main goal for each story. The story parsing engine 116 may interact with the authoring tool module 118 to receive stories from the authors 102. The story parsing engine 116 may use one or more models from the system datastores 220 including the system story models 222 to process the unedited stories to identify the elements in the story. Having identified the elements, the story parsing engine 116 may tag the elements with labels based on the element type including characters, plot, setting, objects, and events in the story to help generate a tagged version of the stories. As the story models evolve, the labels may evolve to include an enumeration based on the element type to create unique references for each element type, including character, object, event, etc. For instance, the story parsing engine 116 may identify and label the first character in the story as "Character1," and the second character as "Character2" and so on, and similarly identify and label the events in the story. The labels may be combined as compound enumerated labels to indicate the link to each other. For instance, the enumerated label "Event2_Character1" may indicate that Event2 is linked to Character1. The story parsing engine 116 may generate an initial information model to store the enumerated labels with the information they reference, and the data associated with other extracted information. For instance, the information model may identify "Character1" as Alice and "Character2" as "John" and a character count as 2 based on having two identified characters. Additionally, the information model may use the enumerated labels to identify the conceptual structures of the story.

In various examples, the story parsing engine 116 may use the enumerated labels and dialog models 228 to help generate adaptable micro-dialogs for the stories. After the story has been processed, story parsing engine 116 may interact with the authoring tool module 118 to present the tagged version of the stories and the information models for the authors 102 to verify and/or provide additional information to fill in gaps. Not all parts of the information models have to be presented to the author. That is, the authoring tool module 118 may present only the portions of the information models that requires verification or is editable by the author. In various examples, the story parsing engine 116 may generate increasingly sophisticated information models having pre-populated micro-dialogs for the stories based on training the system story model. For instance, within a story, there may be many conceptual structures defined by the story elements including characters, character traits, objects, events, timeline, theme, or moral. While not all conceptual structures are important to understanding the story, there are key conceptual structures that an effective reader should be able to understand. As such, an effective information model of the story should learn how to include these key conceptual structures by learning what information needs to be extracted from a story.

Initially, the story parsing engine 116 may use the early system story model to perform basic elements parsing and simple labeling without determining the importance of the elements relative to the key conceptual structures. For instance, an early system story model may perform parsing based on combining natural language parsing and classification to identify nouns and named entity recognition to label the identified nouns and names as characters and objects, identify verb phrases to label the identified phrases as events, and classify words to label additional story elements (e.g., setting, relationship, temporal, etc.). However, as the authoring tool module 118 receive more tagged and scripted versions of the story from the authors 102, the system story model may learn from the author's patterns of asking questions related to conceptual structures with certain labeled elements and adjust the weight based on labels. For example, the story parsing engine 116 may determine, based on the training data, that the authors 102 statistically ask more questions about the character that is tied to the most events, thus based on statistics, determine that the system should also ask questions about characters with similar ties to events. Accordingly, the story parsing engine 116 may learn to generate questions related to that particular character and/or the events that are tied to the character. As an additional example, the story parsing engine 116 may train one or more machine learning models that may identify the key events out of the many events tied to the particular character. For example, in a typical story with a main character, there may be many events tied to this main character, but there may be only a few events that are "key events" in moving the story forward. That is, without understanding these key events, a reader may not fully understand the story.

The story parsing engine 116 may use any portion of the tagged and scripted stories submitted by the authors 102 as input to train one or more of machine learning models stored in the system datastores 220. Machine learning generally involves processing a set of examples (called "training data") in order to train a machine learning model(s). A machine learning model, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In the context of the present disclosure, the unknown input may include, inter alia, stories or reading material that is, or is requested to be, added to database 232, and the trained machine learning model, or the system story models 222, may be tasked with classifying the unknown input as one of multiple class labels. The class labels, in this case, may correspond to a classification of the unknown data as a type of data among multiple different types of data corresponding to different story elements (e.g., characters, events, settings, objects, etc.). The class labels can be indicative of the connection between elements, such as by labeling the data with compound labels (e.g., event_character, opinion_character, relationship_character1_character2, etc.). In some examples, the class labels can be indirectly indicative of the element, such as by labeling the element with the level of importance to understanding the story (e.g., key element, informational element, flavor element, etc.).

The machine learning model(s) may represent a single model or an ensemble of base-level machine learning models, and may be implemented as any type of machine learning model. For example, suitable machine learning models for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models, as stored in the system datastores 220, whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

In various examples, the story parsing engine 116 may train multiple system story models to classify the stories based on story types or genres (e.g., adventure, action, comedy, crime, mystery, science fiction, etc.) and process the stories based on the classification because depending on the type/genre, the story may have a different set element types and key concepts. As the system learns and evolves from additional training data, the story parsing engine 116 may select a sophisticated story model based on the story type and may generate a more complete information model of the story without additional information gap, or missing concept structures, filling needed from the author. Using the more complete information model, the story parsing engine 116 may process the stories to generate increasingly rich tagged and scripted stories with questions that are more directed to the key conceptual structures. In some examples, the story parsing engine 116 may interact with the dialog module 210 to generate adaptable micro-dialogs.

The authoring tool module 118 may interact with the story parsing engine 116 and the dialog module 210 to receive stories from the author(s) 102 and to process the stories to present to the author. The authoring tool module 118 may present a tagged and scripted version of a story and generate an information model indicating concept structures extracted from information in the story for the author to verify. In some examples, the information model may include incomplete concept structures, indicating an information gap, or information not fully extracted from the story. Based on the system identifying an information gap, the authoring tool module 118 may prompt the author 102 to provide information to fill in the information gap. For instance, based on a story pattern, the story parsing engine 116 may determine that there is a theme or moral to be extracted from the story, but the system isn't able to identify theme or moral. The system may prompt the author 102 to provide the theme or moral. In another instance, the story parsing engine 116 may determine based on parsing the story, that there are emotional words or expressions, such as words or phrases expressing an emotion or emotional state (e.g., wonderful, marvelous, awesome, boo, panicked, sigh, etc.), used by the author of the story, thus providing evidence of an author's opinion, but the system could not identify the opinion. For instance, in example tagged-story 124, the author expressed, "Oh no," and "Hooray." The story parsing engine 116 may identify and determine that the first expression expresses a negative or disappointed emotion, while the second expression expresses joy. The system may prompt the author 102 to provide the information.

Additionally, the authoring tool module 118 may allow the authors 102 to edit the tags and script, and/or add additional tags and script. For example, the author(s) 102 may enjoy writing and editing stories that have very definite points of conflict and resolution, and if the system does not have such labels, the author may add <conflict> and <resolution> as story element types. As an additional example, as the stories become longer and more complicated with chapters or plots with subplots, the author may add labels for <chapter> or <subplot>. As the reading comprehension system 112 is trained on the data with the new labels, the system story models may learn how to similarly use the new labels and process stories to include the new labels. Accordingly, the authors 102 may help evolve the system to label increasingly difficult reading.

In various examples, the authoring tool module 118 may allow the author(s) 102 to generate one or more aliases for the enumerated labels. To help the author better identify certain elements, such as identifying the main character, the authoring tool module 118 may allow the author to create an alias for the enumerated labels and a lookup table may be generated to translate the label back and forth.

In some examples, the authoring tool module 118 may interact with the visual aid module 208 to provide a visual editor for the author to generate questions to help interpret reading concepts into visualizations. The visual editor may present a blank stage for the author to add one or more images to illustrate a question. The visual editor may allow the author to manipulate the images. The visual aid module 208 may include a collection of images that are tagged with image descriptions and the authoring tool module 118 may retrieve a small sample of the images based on possible images that may apply. For the instance, a story about Alice and John playing soccer may retrieved images tagged with description related to "girl," "boy," and "soccer." The authoring tool module 118 may include a collection of illustrated question templates for the author to choose from. For example, a spatial question template may ask, "How close is <character> to <object>," and selecting the character and object may generate an illustration of that question.

When the author is done with the editing process, the author may indicate so by selecting an input from the Authoring Tool UI, and the authoring tool module 118 may perform another parse of the current information model to determine if there are any information gaps remaining. As described above, an information gap in the information model may indicated by incomplete concept structures to identify information not fully extracted from the story. Although the information gap may be identified in the information model from the initial parse, in some examples, an information gap may be introduced by the author 102 manually labelling an element. For instance, if the author 102 manually labels a sentence as "opinion_author" to indicate the sentence expresses an opinion of the author of the story, the system may create a concept structure to encapsulate this information. However, if the system is not able to determine what is the opinion of the author of the story, the system may prompt the author 102 to provide this information and link the portion of the story that provides evidence of this information. If the system determines that are still information gaps remaining, the authoring tool module 118 may prompt the author to provide information to fill the gap(s). The author may choose to provide additional information to fill the gap(s), mark the gap(s) as a system identification mistake, or leave the gap(s) unanswered. After a final confirmation, the reading comprehension system 112 will process the information model received from the authoring tool module 118 and save it as the system information model for the story.

The reading tool module 120 may interact with the dialog module 210 and the visual aid module 208 to present reading comprehension lessons to the student(s) 106 via a user interface. Initially, the user interface may request identification from the student(s) 106 to retrieve a student user data model created for the student, or if the student(s) 106 is a new user, to create a new user account and student data model. Following a selection of reading comprehension lesson or story, the reading tool module 120 may retrieve the system information model for the selected story and generate a new student information model for the story. The system information model is what the system understands about the story, while the student information model is what the system understands as the student's understanding of the story. Because the system general generally does not know what the student 106 understands about the story until it asks the student through dialog, the student information model may start out mostly unpopulated. As the student 106 responds correctly to the questions about certain concept structures, the system may begin populating the student information model with the certain concept structures. The reading tool module 120 may use the system information model to guide the students 106 to gain a better understanding of the selected story, and to help the students 106 improve their abilities so that they might improve their skills of reading comprehension in general.

Accordingly, the reading tool module 120 may interact with the assessment module 212 to constantly assess the student's current understanding of the selected story and one or more student's reading comprehension skills in general. The assessment module 212 may constantly assess the student's current understanding of the selected story based on analyzing the concept structures identified in the student information model in comparison to the concept structures to the system information model. Initially, the student information model may not be populated with any concept structures based on the student 106 not yet having answered any questions about the story. In at least one example, the assessment module 212 may look at the student's user data and determine that the student 106 have consistently identified or is at a high enough skill level to identify certain story elements such as characters and name, and may populate the concept structures related to the certain story elements accordingly. During the dialog session, the reading tool module 120 may select and present questions related to the concept structures that are present in the system information model, but have not yet been populated in the student information model. Based on the student 106 answering the question correctly, the assessment module 212 may determine that the student 106 has identified one or more concept structures and populate the structure accordingly in the student information model. In some examples, the one or more student's reading comprehension skills may be assessed by numerical value, such as based on a 0 to 100 value or based on grade-level estimate or a combination of the two, and the one or more skills may be assessed by one or more specific categories (e.g., vocabulary, grammar, comprehension, etc.). If the assessment module 212 determines that the student(s) 106 needs to develop additional reading skills in order to fully comprehend the present story, the reading tool module 120 may interact with the challenges module 214 to present one or more skill building challenges.

In various examples, the reading tool module 120 may interact with the system learning module 216 to present a question to the student(s) 106 to help fill an information gap in the system's information model for the story. That is, if the system learning module 216 determines that its own understanding of the story as represented by the information model is incomplete, the system may generate a question to add information to the model.

The visual aid module 208 may interact with the authoring tool module 118 and the reading tool module 120 to provide illustrations and visual cues for the students 106. As the system conducts a dialog with the student(s) 106, the visual aid module 208 may present visual elements to represent the student information model to affirm key concepts that the student(s) 106 has demonstrated an understanding of.

The dialog module 210 may interact with the story parsing engine 116 to generate adaptable micro-dialogs to present to the authors 102 while using the authoring tool UI to edit stories. In some examples, the micro-dialogs may include small dialogs that talks about portions of the story (e.g., characters, setting, events, opinions, relationships, moral of the story, etc.). In various examples, the micro-dialogs may include dialogs that are part of a series of dialogs. In additional examples, a micro-dialog may depend on another micro-dialog. To guide the dialogs, the dialog module 210 may select a reading development strategy to determine the types of dialogs to generate or present. In at least one example, the development strategies may include main theme, reading comprehension standards, reading skill, and student needs. The selected strategy may be provided by the author as part of the editing process or may default to one of the strategies (e.g., main theme). The selected strategy may determine the main goal of the dialog session, such that the micro-dialogs selected may move the dialog session towards the main goal.

The dialog module 210 may evolve a collection of micro-dialogs and use this collection to generate dialogs for a story. Initially, the collection of micro-dialogs may include a small collection of generic dialogs. The collection of micro-dialogs may evolve over time to include a combination of dialogs that have been extracted from the tagged and scripted stories as provided by the authors 102. The collection of micro-dialogs may include smaller sets of micro-dialogs each asking for a bit of information but all sharing a sub-goal of gaining some specific bigger piece of information. That is, to better simulate the patient guidance of a teacher, who may continuously ask for information to guide the student, the micro-dialog is structured to identify a sub-goal and ask for information leading to the sub-goal. Additionally, as discussed above, the overall development strategy may provide the main goal for the selection of micro-dialogs. For example, if the development strategy is to help the student(s) 106 develop a better understanding of a main theme of a story, then the micro-dialogs may have sub-goals to provide pieces of information to ultimately lead the student(s) 106 to understanding the main theme. In another example, if the development strategy is to develop a specific reading skill, then the micro-dialogs may have sub-goals that are related to developing the specific reading skill.

In various examples, the data structure for a micro-dialog may include data related to:
  Dependencies: Other information or micro-dialogs that are relevant/required to proceed. Information that the student(s) 106 and system should know prior to the dialog.
  Objectives: The desired learning objectives for the student(s) 106 and system.
  Pedagogy: Provided references for teaching the goals, strategies or implementation approaches
  Flow: A generalized flow for what should occur in the dialog.
  Base: A dialog that can be used as a basis for any story.
  Examples: Other example dialogs that are used to gain information.

The collection of micro-dialogs may include a list of dialog topics and subtopics.

In some examples, the dialog module 210 may evolve this collection of micro-dialogs labeled with topics and subtopics to help the system identify and change between dialog goals or sub-goals in the middle of a dialog session. For instance, if a student 106 is struggling with vocabulary during a dialog session about a story event, and the system determines to switch from the current micro-dialog about the event to a vocabulary session. The system may save the current progress in the story and then identify a micro-dialog labeled with "help/vocabulary" that is to be applied to the student 106. As a non-limiting example, an example listing and labeling of micro-dialog for a simple children's story may include:
  / introduction
  / story/select / story/read
/ help
/ help/vocabulary
/ help/idiom
/ help/text-structure
/ help/text-structure/description
/ help/text-structure/compare-contrast
/ help/text-structure/cause-effect
/ help/text-structure/sequence
/ help/text-structure/argument
/ help/story-grammar
/ help/story-grammar/setting
/ help/story-grammar/characters
/ help/story-grammar/kick-off-event
/ help/story-grammar/sequence
/ help/story-grammar/conflict
/ help/story-grammar/resolution
/ help/story-grammar/antagonist-protagonist
/ help/story-grammar/key-event
/ help/background (topic)
/ setting
/ summary
/ temporal
/ meaning
/ character/core
/ character/importance
/ character/traits
/ character/relationships
/ character/reactions (type)
/ character/reactions (type)/evolution
/ character/protagonist-antagonist
/ character/explore
/ events
/ events/kick-off
/ events/timeline
/ events/categorize
/ events/climax
/ author
/ author/opinion
/ author/opinion/support
/ idiom
/ problem-solution
/ conflict
/ theme
/ moral
/ moral/explain
/ ideas/expand
/ meta/motivation
/ meta/understanding Although some micro-dialogs, such as dialogs to provide introductions and help, may be constructed outside of the story, some micro-dialogs may require identifying certain story elements to construct. As discussed above with respect to the story parsing engine 116, the stories may be processed and tagged with labels based on element types (e.g., characters, objects, and events, etc.) and the labels may include an enumerated value for each of the element types. The enumerated labels may be used by the dialog module 210 to generate pre-populated micro-dialogs. The collection of micro-dialogs may include dialogs with element fields to be completed by the enumerated labels to help generate a question. For example, some of the dialogs may include element fields such as <event> or <character> to be replaced by an event or character tagged in the story. Although not an exhaustive list, micro-dialogs may include example questions having element fields as set forth below:

Temporal
 What happened between <event_a> and <event_b>?
Spatial
 What was the spatial relationship between <character> and <object> when <event> occurred?
 What are relative distances between <object_a> and <object_b>?
 Was <object_a> close to <object_b>?
Characters
 Spatial
  Where was <character> when <event> happened?
 Thoughts
  How did <character> feel when <event> happened?
 Opinion
  What is the <character>'s opinion about <event>?
  Did the <character>'s opinion change in this story?
 Motivation
  What was the <character>'s motivation to do<event>?
 Relationships
  What relationship does <character_a> have to <character_b>?

In the example questions listed above, the micro-dialogs may be labeled by the topics (e.g., temporal, spatial, character) and subtopics (e.g., thoughts, opinion, motivation). A "temporal" topic question may relate to questions about time or time relationships, such as sequence of events. A "spatial" topic question may relate to questions identifying the spatial relationship between characters, objects, or things. A "character" topic question may relate to questions about characters in the story. In this example, to help generate an answer, the dialog module 210 may leverage the enumerated label used in the question and analyze the information tagged by the enumerated label to help identify information and evidence for an answer. For instance, if the question asks for the relationship between Character1 and Character2, the system may identify a label containing some variation of <Relationship_Character1_Character2>. If the question asks a temporal question, and there is only one <Temporal 1> label, the labeled information may contain the answer. By analyzing a particular portion of the story that was tagged with a particular enumerated label, the dialog module 210 may extract the information to answer the question.

In some examples, the dialog module 210 may initially generate a collection of micro-dialogs having the element fields pre-populated with all possible combination of enumerated labels that fits within the element type and the system may determine from the collection which question leads to extracting the key concepts from the story. Additionally, and/or alternatively, the dialog module 210 may leverage the information model to remove questions that have a low probability of being important to building a good understanding of the story. That is, an important question should lead a student 106, who answers the question correctly, to identify at least one key concept structure that ultimately leads to the main goal, such as to understand the moral or main idea of the story. For instance, if the information model has a timeline of events and a second character does not appear until near the end of the story, a question about how the second character feels about an early event may have a low probability of building a better understanding of the story.

In at least one example, the dialog module 210 may prompt the author to add a dialog while the author is editing the story. This prompt may be triggered by the author adding a new label to tag a story element while editing the story. The dialog module 210 may determine, based on the addition of a new label, that the information model of the story is incomplete unless a dialog about the newly labeled story element is included. As a result, the reading comprehension system 112 may provide a prompt for the author to add a dialog.

As a non-limiting example, using the above referenced example tagged-story 124 as an example, assuming the story parsing engine 116 failed to identify and tag any author's opinion in "The Winning Shot" story, and presented the tagged story without either <Opinion1_Author> or <Opinion3_Author> in the Authoring Tool UI. Then from the UI, the author may decide to manually tag the elements. If the author tags the sentence, "Oh no" with <Opinion_Author>, the dialog module 210 may identify a micro-dialog under "/author/opinion" and prompt the author to add the dialog.

In an additional example, the dialog module 210 may use one or more dialog models and the student's user data including user models to guide the dialog while conducting a dialog session with a student 106 that is using the reading tool UI. The student's user data may provide information on reading skills that the student(s) 106 is strong in and areas that the student(s) 106 could use more practice on. Additionally, the student's user data may store user models including old student information models for stories that the student(s) 106 has previously read or past dialogs sessions that the student(s) 106 had with respect to those stories. These past dialogs the student(s) 106 had with the system may be leveraged by the dialog module 210 to generate analogies and build on concepts already learned.

To further help determine which dialog to present, the dialog module 210 may generate a student information model to represent what the system understands as the student's current understanding of the story. In various examples, if the system determines, based on the student's past record, that the student(s) 106 excels in certain area of reading comprehension, the system may propagate structures in certain area of the student information model to skip over dialog for those area. The goal of the dialog module 210 and its associated model is to contain all mechanisms by which the student(s) 106 and machine interact to bring the student's "information model" closer to the system's information model for the story. Thus, if the student's answer meanders to unimportant information, the dialog module 210 may gently steer the conversation back to important information. To help segue a conversation, the dialog module 210 may identify a dialog that relates to the current topic based on common element. On the other hand, if the student(s) 106 is already discussing a key concept such as the main character, the dialog module 210 may encourage the same line of dialog.

In at least one example, the information model for a story may be incomplete, thus the dialog module 210 may interact with the system learning module 216 to generate dialog to help the system add to the information model of the story. The system learning module 216 may gather and store the answers received from the students 106. Once a predetermined minimum sample size of answers has been received, the system learning module 216 may perform data analysis on the answers. If the system is able to determine with some degree of confidence that it has the correct answer based on the analysis, the answer may be added to the information model.

The assessment module 212 may interact with the reading tool module 120 to constantly assess the student's development and emotional needs. The assessment module 212 may assess the type of learner (e.g., visual, auditory, verbal, kinesthetic, etc.) of the student, and to present additional learning aids associated with that learning style. The assessment module 212 may store one or more specific user model for each student 106 to help determine the student's general reading comprehension skills and student's needs. Based on the student's user model, the assessment module 212 may assess the student's current progress and may identify one or more areas where the student(s) 106 has struggled. Accordingly, the assessment module 212 may interact with the dialog module 210 to steer the story related dialogs toward the area in which the student(s) 106 has struggled to help the student(s) 106 overcome problem areas. If the assessment module 212 determines that the student(s) 106 struggles in the exact same area for all stories, the reading comprehension system 112 may save the current story progress and redirect the dialog session toward skill specific dialogs. Additionally, and/or alternatively, the assessment module 212 may interact with the visual aid module 208 to present visual elements to help illustrate the problem areas.

In at least one example, the assessment module 212 may constantly assess the student's emotional level. The emotional level assessment may be based on the student user model including information related to the student's age or resilience. Using the emotional level assessment, the system may determine whether to change the current dialog topic completely if a student 106 failed to answer a question correctly, or if the question should be rephrased. That is, the assessment module 212 may determine if the dialog should nudge a student 106 toward a correct answer or if the dialog should mark the current dialog but move on to another dialog before revisiting the marked dialog. For instance, with older students 106, the system may determine that the student 106 could be asked a rephrased question one or more times. Then with younger students 106, the system may rephrase the question once but then move on to a different topic that the student 106 is determined to be more proficient in to help build the student's confidence before asking the question an additional time.

In some examples, the assessment module 212 may identify and store student information models from stories that the student 106 has previously read or interacted with. These previously constructed student information models may allow the assessment module 212 to determine if a student 106 has excelled in understanding a story even in the area where the student 106 typically struggle. Such a stored information model may be leveraged to help guide the student 106 to understand a similar concept in another story. Additionally, the assessment module 212 may look out for any special interests the student 106 may have expressed to help engage the student. For instance, if a student 106 has trouble understand spatial concepts, and the student 106 had expressed a love for baseball during dialog, the assessment module 212 may interact with the challenges module 214 to provide reading material related to baseball.

In additional examples, the assessment module 212 may assess the student 106 beyond the student's understanding of current lessons to determine if there are other issues that may hinder the student's learning ability, including, but not limited to issues related to reading ability, mental health, color blindness, etc. For example, the assessment module 212 may store the performance of each reading session and for issues related to: (1) reading ability, determine if the student 106 exhibits dyslexia symptoms: (2) mental health, determine if student 106 continuously fails to identify social issues: or (3) color blindness, determine if student 106 is not recognizing color in illustrated questions. That is, the assessment module 212 may include one or more psychological or behavior pattern tests that may assess the patterns of behavior for the students based the student's user data, or from time to time. If a specific issue is identified or if the student 106 consistently perform poorly on one or more skills in dialog sessions, a teacher or parent may be informed such that additional assessment or specific guidance may be determined and/or provided for the student 106. During a dialog with the student 106, if the assessment module 212 determines that the student 106 needs to develop additional reading skills outside of the current story, the assessment module 212 may interact with the challenges module 214 to provide the appropriate skill development challenge. If the assessment module 212 determines the student 106 could use extra help to engage and understand the challenge, the student's hobbies and/or learning style may be leveraged to provide reading material related to the student's hobbies and/or may be presented in relation to the learning style.

The challenges module 214 may interact with the reading tool module 120 to present reading skill challenges to help the student 106 develop reading skills. The skills may include the development strategies as described above, including the main theme, reading comprehension standards, reading skill, and student needs. In various examples, the challenges may be determined by the student's user model/data or predetermined by a teacher or a course curriculum. Alternatively, and/or additionally, the student 106 may also request to work on a skill challenge from the reading tool module 120.

The system learning module 216 may interact with the reading tool module 120 to help refine the information model for the story. Initially, the system learning module 216 may assess the information model for the story and determine if the information model is incomplete. That is, the information model may have identified conceptual structures that should be built for the story, but parts of the structure may be missing, leaving an information gap in the model. If such an information gap exists, the author may be prompted to fill the gap in the authoring phase. However, if the information gap exists beyond the authoring phase, such that the system learning module 216 determines there remains information that could be extracted from the story, the system learning module 216 may generate questions to ask the student. In various examples, the system learning module 216 may present the question only to students 106 that have demonstrated an understanding of the story. In another example, the system learning module 216 may present the question to all students 106 and rely on the data analysis to help filter out the bad answers. The students 106' answers may be collected and stored as possible answer data until a predetermined minimum number of sample answers have been gathered. Based on having at least the minimum number of sample answers, the answer data may be analyzed (e.g., clustering analysis) and the outlier answers may be discarded. If the system is statistically confident (e.g., based on meeting a threshold confidence score calculated during analysis), that resulting answer is correct based on its analysis, the system may add the answer to the information model.

The system datastores 220 may include system story models 222, world models 224, information models 226, dialog models 228, user models 230, and database 232. The database 232 may store at least some data including, but not limited to, data collected from the reading comprehension module 206 and associated components, including data associated with user profiles, user information, stories, and images. In an example, the data may be automatically added via a computing device (e.g., content server(s) 114). User profile(s) may correspond to one or more user profiles associated with the reading comprehension system 112. In various examples, a user profile may include information associated with the author(s) 102 such as author's teaching background and affiliations with schools, feedback for stories submitted by the author, etc. In some examples, one or more authors 102 may provide multiple edits to the same story, the system may aggregate the edits to the story, and may determine that an individual author is consistently providing edits that are inconsistent with edits obtained from other authors and either revoke authoring privilege or not use that individual author's edits. In additional examples, a user profile may include information associated with a student 106 such as student information, age, reading level, grade, schools, and, system feedback data, etc. In additional or alternative examples, at least some of the data may be stored in a cloud storage system or other data repository.

The system story models 222 may include models that the story parsing engine 116 may use to process the stories and tag the elements with labels. In some examples, the system story models 222 may include different story models 222 based on the story type or story genre to help extract the information needed to generate information models. For instance, an adventure story would need to be able to identify different key concepts compared to a mystery novel, so the two genres may need different sets of element types to help identify key concepts.

The world models 224 may include data that are not specific to any one story but rather general world knowledge information that a student 106 may need to know to better understand the story. For instance, if the student 106 was reading a story about soccer, but has no idea what soccer is, the world models 224 may provide background information. Additionally, as the system learns from the users or from extrapolated data, the system may add to its own world knowledge.

The information models 226 may include one or more information model for each story. An information model is built around understanding what information needs to be extracted from a story. Initially, a first information model of a story may be generated by the story parsing engine 116 to represent the reading comprehension system 112 understanding of the story. This first information model may include gaps in its knowledge. The first information model may be presented to the author(s) 102 to verify the system's understanding and to provide information to fill the knowledge gap. After the author finish editing the story, the verified and edited information model is used as a dialog map for the story, and the information model is stored until a student 106 wants to read the associated story.

In various examples, the reading comprehension system 112 may build an initial story information model 226, which contains a semantic representation of the story to represent an initial understanding of the story. This first model is referred to herein as the "story information model 226" and described below in more detail. Generally, the initial story information model 226 expresses the initial understanding in terms of data structures that include syntax elements and/or sets of generative semantic primitives (GSPs). Generative semantic primitives are a small set of structures that express basic facts about the world and that can be composed to represent the full range of meaning of natural language. For instance, for a sentence, "Ben brought the food to Ava", the syntax elements may be identifying "brought" as the verb and the semantic primitives may include facts about the entities in the sentence, such as Ben causing an action that results in the food being located near Ava or Ben's intention that Ava possess the food. The GSPs can be used, among other things, for answering reading comprehension questions.

Understanding language is more about what is unsaid and part of human experience than what is explicit in the written word. Typically, the best interpretation of a natural language statement is the one that "makes the most sense" with respect to our knowledge about the world. The device(s) 104 maintains and continuously updates another model that contains beliefs about what is true about the world. This second model is referred to herein as the "current world model" and described below in more detail. The current world model is composed of a collection of frames, where each frame is a collection of propositions, such as GSPs, that are likely to be true in some common context. The device(s) 104 constructs an initial story information model 226, drawing upon the knowledge in the current world model and on knowledge induced automatically from other sources, such as large language corpora.

After the initial story information model 226 is constructed, the learning and understanding device(s) 104 may engage in a dialog with users who have also read the story. The device(s) 104 forms one or more user questions to pose to humans to test this initial understanding of the story. For example, the device(s) 104 may generate questions in cases where the story information model 226 is known to be incomplete, where the system does not have high confidence in its semantic representation, or where there are reading comprehension questions that cannot be confidently answered. The system may ask questions to validate its understanding or to acquire missing knowledge. For example, the user questions may offer other possible sets of generative semantic primitives to challenge whether the generative semantic primitives in the initial story information model 226 convey an accurate meaning of the story. The user questions are provided in natural language transformed from the generative semantic primitives and sent to human users for their input. The users' responses to the questions is returned to the system 112 and used to augment the current world model and to modify or produce a new iteration of the story information model 226 that represents a new and enhanced understanding of the story. The new model expresses the new understanding as data structures that associate a different set of generative semantic primitives that may further be assembled into frame structures that provide even more meaning. This process can be repeated multiple times until the device(s) 104 has worked through the various scenarios and its understanding of the story aligns with how the human users would understand the story. The updated current world model 224 is retained for use in processing other natural language stories that might be ingested in the future. The individual story information models 226 may also be stored, to be recalled later if necessary. As the computing system goes through multiple user interactions on multiple stories, the current world model 224 is incrementally enriched in each interaction, and the system learns to consistently, accurately, and independently determine semantic representations for natural language text. The system can read progressively more difficult stories, documents, and other texts over time and engage humans to learn and understand increasingly more difficult subject matter. As a result, the system continues to build and grow the world models 224 with new GSPs and new frames, as well as other resources used in the system.

The dialog models 228 may gather and maintain one or more collections of micro-dialogs. As the system learns and evolves, the dialog models 228 may similarly evolve with the micro-dialogs extracted from the stories. In some examples, the dialog models 228 may include different dialogs models for the different story type or genre. As discussed above with respect to the story models 234, different story type or genre may require different sets of element types to properly tag the key content. Accordingly, the dialog models 228 may similarly require different sets of micro-dialogs with different element fields to properly generate dialogs.

The user models 230 may store one or more user models for each user based on their user type. For both authors 102 and students 106, the user models 230 may store information indicating the strength and weakness for each type of user. For instance, the author(s) 102's user model may include information on the strength and weakness of the author's editing skills, while the student's user model may include information on the strength and weakness in the student's reading comprehension skills. In various examples, the user models 230 may also store the author(s) 102 information model for each story that the author edited. The author information model may reflect the information that the author believes needs to be extracted in order to obtain an adequate understanding of the story. In additional examples, the user models 230 may store a different student information model for each story that the student 106 is currently reading and/or has read in the past. The student information model may reflect what the system understands as the student's understanding of the story. The system may compare the student information model to the system information model for the story to conduct dialog to bring the student information model closer to the system information model.

Figure 3:
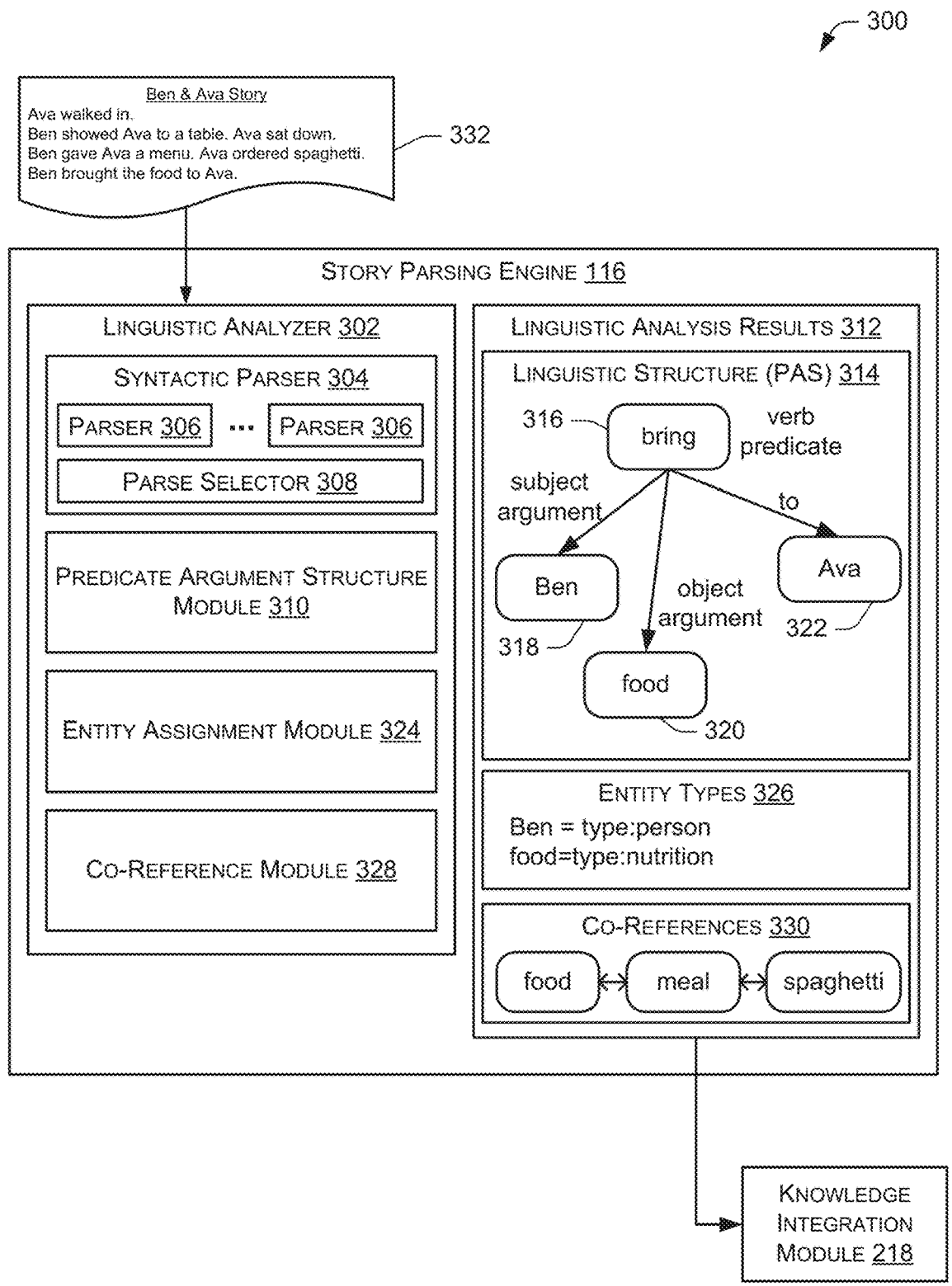
FIG. 3 is a block diagram of an example implementation of a story parsing engine employed by the architecture of FIG. 2.

FIG. 3 shows an implementation of the story parsing engine 116, illustrating select components that may be used to process a text string, such as a story. The story parsing engine 116 is configured to propose multiple possible linguistic analysis results, and to pass those results onto the knowledge integration engine, which calculates a joint distribution over the results using joint inference. The story parsing engine 116 ingests a story 332 and passes a digital representation of the story 332 to a linguistic analyzer 302 for natural language processing (NLP). The linguistic analyzer 302 receives the story 332 and breaks the story into digestible segments, such as words, phrases, sentences, or other definable text-strings. The linguistic analyzer 302 has a set of NLP components that perform various language analyses on the text strings. A syntactic parser 304 identifies the parts of speech of words and the grammatical relationships between them in a sentence. In one implementation, the syntactic parser 304 is implemented in part by using the Stanford CoreNLP package for syntactic parsing.

In some implementations, the story parsing engine 116 may employ a single parser that outputs multiple possible parses for a sentence or multiple parsers 306 to provide parsing diversity. A parse selector 708 may be used to choose or merge the parse results according to desired applications, with the goal to ultimately improve parse accuracy for the given applications. In other implementations, there may be no parse selector, but rather the multiple parse results will be passed to the knowledge integration module 218, which will determine the confidence in each parse result jointly with the confidence in the semantic and frame structures, as described below in more detail.

The linguistic analyzer 302 of the story parsing engine 116 also includes a predicate argument structure (PAS) module 310 that produces a parser-neutral representation of predicates and their instantiated arguments which serve as primitive beliefs on which other analysis components operate. The PAS module 310 transforms a parser-specific representation of grammatical relations to a common representation of predicates and arguments so that grammatical information produced by different parsers can interoperate in the system. In the transformation process, the PAS module 310 also performs certain normalization procedures, such as changing passive voices into active, and simplifies the representation by removing certain grammatical relations that are not central to processing of the sentences. For instance, following the syntactic parse of the sentence "Ben brought the food to Ava" in the story 332, the PAS module 310 recognizes that "brought" or its root form "bring" is the main predicate (verbal predicate in this case), and that "Ben" is the subject argument and "food" is the object argument. The PAS module 310 tags or otherwise marks these words with the appropriate labels. In one particular implementation, the PAS module 310 is configured on top of the syntactic parser 304: in other implementations, the syntactic parser 304 and PAS module 310 may be implemented as a common executable module.

As shown in FIG. 3, the linguistic analyzer 302 outputs a set of linguistic analysis results 312 that will be passed from the story engine as an input to the knowledge integration module 218. One part of the linguistic analysis results 312 is a linguistic structure 314 produced by the syntactic parser 304 and the PAS module 310 of the linguistic analyzer 302. The linguistic structure 314 is embodied as a data structure containing the words of the sentence, the syntactic labels of the words, and PAS relationships amongst the words. The data structure of linguistic structure 314 is illustrated in FIG. 3 using a tree-like visualization in which key words are represented as nodes and their relationships represented by interconnecting branches. Continuing the example sentence "Ben brought the food to Ava", the word "bring" (i.e., the lemma form of "brought") is shown as node 316 and identified as a verb predicate. The word "Ben" is represented as node 318 and tagged as the subject argument relative to the verb predicate "bring". The word "food" is represented as node 320 and marked as the object argument relative to the verb predicate "bring". The word "Ava" is represented by node 322 with a relationship to the verb predicate "bring" indicating that Ava is the target of the bring predicate.

The linguistic analyzer 302 further includes an entity assignment module 324 to assign entity types to the various words in the sentence. The types are predetermined categories from one or more applicable ontologies. Essentially any semantic type can be defined, but common types might include person, country, location, furniture, sport, etc. In our example, the entity assignment module 324 assigns a "person" type to the word "Ben" and a "nutrition" type to the word "food", as illustrated in the entity type data structure 326. In one implementation, the entity assignment module 324 may be implemented using the named entity recognizer in the Stanford CoreNLP package, which is used to automatically annotate entity types. Another implementation may involve use of a word sense disambiguation component that assigns types based on the WordNet hierarchy to the words in the sentence.

The linguistic analyzer 302 also has a co-reference module 328 that identifies co-references of words/phrases in the sentence. Co-references are words/phrases that, although not necessarily lexically identical, refer to the same real-world entity. In this example, suppose the story 332 had other sentences including the words "food", "meal", and "spaghetti". The co-reference module 328 might identify these words/phrases as meaning the same thing, and produce a data structure 330 that associates the words/phrases in some manner. The co-reference module 328 may identify entity co-references as well as event co-references. The linguistic analysis results 312 are delivered to the knowledge integration module 218, which is described in more detail with reference to FIG. 4.

In another implementation, as the linguistic analysis results 312 are integrated into the story model, the joint inference engine 404 can further leverage downstream the linguistic analysis results to re-compute the likelihood of upstream results as they apply to natural language processing (NLP) analysis. The story parsing engine 116 considers higher level semantic information and world knowledge in scoring alternative parses that is derived from frame-level knowledge inferred over a whole story. That is, the story parsing engine 116 can utilize the higher level downstream knowledge to re-compute the likelihood of alternative parses. In addition, this ability to dynamically re-compute likelihood strengthens over time as the system accumulates more knowledge in the current world model 224.

Figure 4:
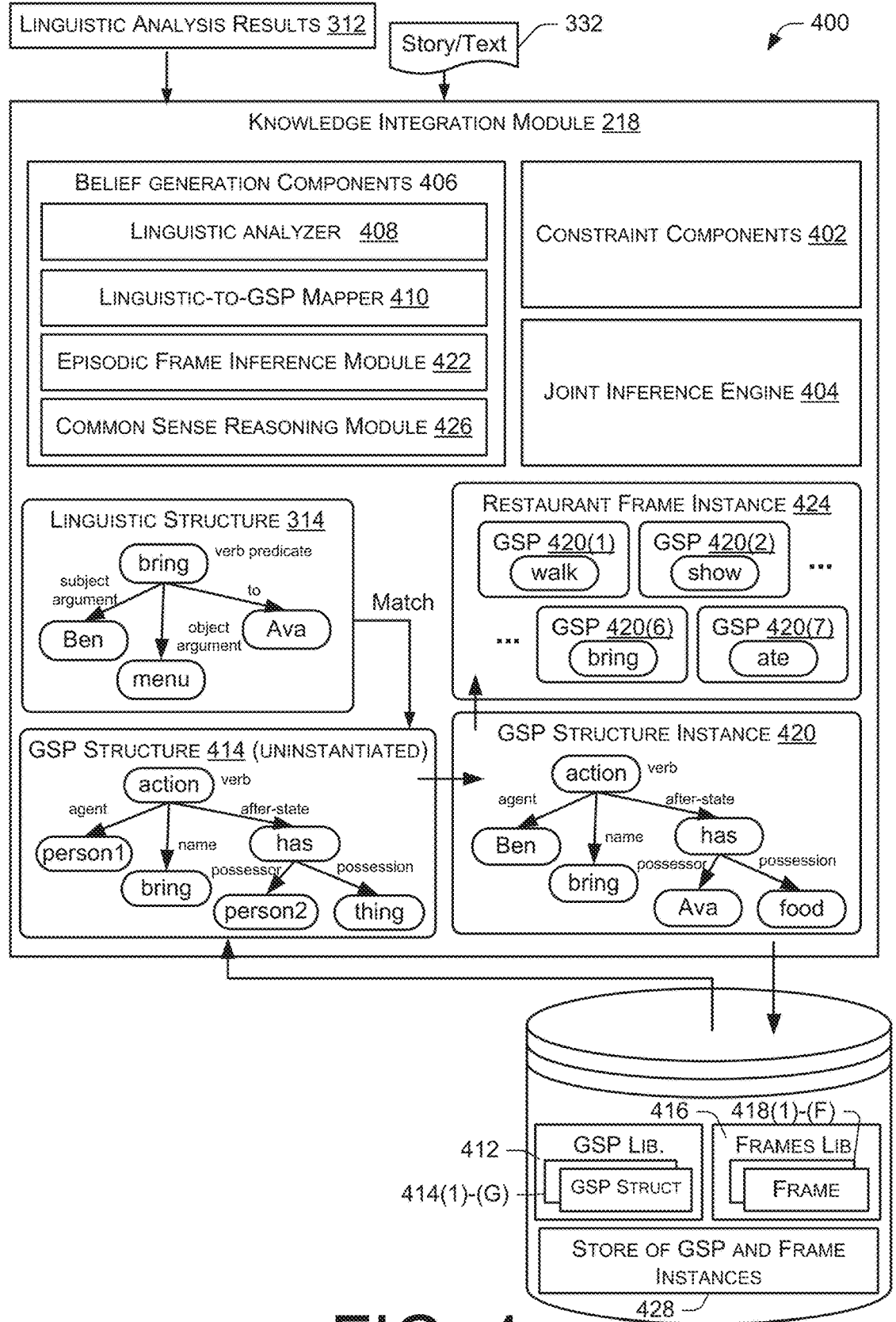
FIG. 4 is a block diagram of an example implementation of a knowledge integration module employed by the architecture of FIG. 2.

FIG. 4 shows an exemplary implementation of the knowledge integration module 218, illustrating select components that may be used to semantically process the linguistic analysis results 312 of the story 332. The linguistic analysis results 312 are created by the story parsing engine 116 from the ingested story and passed to the knowledge integration module 218 (along with the story 332) to initially build a story information model 226 representing the story. The knowledge integration module 218 builds the story information model 226 as a probabilistic semantic representation of the story that makes sense with respect to the system's current knowledge as captured in the current world model 224.

The knowledge integration module 218 is a set of highly configurable and flexible executable components that evolve the story information model 226 over time through joint inference and human interaction to develop the meaning of the story by aligning the story information model 226 with the current world model 224. The knowledge integration module 218 infers relevant semantic structures that take in the linguistic analysis results 312 of sentences in the story and begin to provide meaning for those sentences. With joint inference, the knowledge integration module 218 combines multiple levels of interpretation, thereby interpreting the text at various levels of conceptual richness. As noted above, higher levels of interpretation are richer, but also more implicit and therefore harder to discover. The first level of interpretation is recognition of the explicit natural language text found in the story. The second level of interpretation concerns the linguistic analysis performed by the story parsing engine 116. The next two levels of interpretation—semantic analysis to provide generative semantic primitives (i.e., level three) and frame semantics (i.e., level four)—are performed by the knowledge integration module 218 to discover meaning implicit in the story.

In FIG. 4, the knowledge integration module 218 has a joint inference engine 404 that can operate in a variety of ways. In one implementation, the joint inference engine 404 proposes multiple possible "worlds", where each world has a set of beliefs that are considered true. The belief generation components 406 are iteratively run on worlds, observing the beliefs that are true and proposing distributions over new beliefs. New worlds are created by drawing beliefs from those probability distributions. The constraint components 402 are run to evaluate the probability of worlds. When the process is finished, the marginal probability of a belief is the sum of the probability of the worlds in which it is true. Since the marginal probabilities do not capture the relationships between probabilities of beliefs, the system may also store the worlds themselves as part of the world models 224. Further, this may alternatively be accomplished for instance through techniques such as a Markov chain or Monte Carlo sampling.

In one non-limiting approach, the belief generation components 406 include a linguistic analyzer 408, which produces probability distributions over beliefs that express the linguistic structure of each sentence or phrase within the linguistic analysis results 312, such as predicate argument structure (PAS), word senses, entity types, and co-references. For example, the linguistic analyzer 408 may receive a world containing the belief that the text, "The bat was flying toward him" was true, and output a probability distribution containing the belief that the bat was an animal with 80% probability and a baseball bat with 20% probability.

The belief generation components 406 may further include a linguistic-to-GSP mapper 410 that, based on information such as PAS and word senses, produces probability distributions over instantiated GSPs that represent possible semantic interpretations of the text. The linguistic-to-GSP mapper 410 may use the frame inference process discussed above, making use of frames from the current world model 224 that each contain a mixture of linguistic analysis result propositions and GSP propositions. Continuing the previous example, the linguistic-to-GSP mapper 410 might receive a world in which a bat was an animal and was the subject of the verb "flying", and produce a probability distribution with 99% probability in a GSP where the bat was the agent of the flying action and a 1% probability that it was not (i.e., it was propelled towards him by some other means, like in the baseball bat case). As represented in FIG. 4, the current world model 224 maintains libraries of the GSP and frame semantic structures initially in their uninstantiated state, including a GSP library 412 of uninstantiated GSP structures 414(1)-(G) and a frames library 416 of generic frame structures 418(1)-(F).

The GSP structures 414(1)-(G) in the GSP library 412 may be predefined to capture the meaning of various facts, situations, or circumstances. For instance, one GSP structure may express an action and the structure includes roles that define the action such as a reifier, an agent, what happens before the action, and what happens afterwards (i.e., elements of Reifier, Agent, Before, After). Other GSP structures might express an experience (with roles of Agent, Experience-relation (e.g., see, hear, etc.) and Stimulus), spatial location (with roles of Location-relation, Entity1, Entity2), temporal location (with roles of Temporal-relation, Event1, Event2), and possession (with roles of Owner, Possession).

The GSP structures 414(1)-(G) begin as uninstantiated concepts that correspond to a basic kind of fact. For instance, there is a GSP structure for spatial location that, when instantiated, provides meaning of a fact about spatial location. There is a GSP structure for temporal relation that, when instantiated, means a fact about temporal relations. Each uninstantiated GSP structure 414 has its own specific set of roles to be completed with information explicit or implicit in the story. The GSP structure for spatial relation has one role for a first object or location, another role for a second object or location, and a third role for specifying a spatial relationship between the first and second objects (e.g., near, on, in, above, below; etc.).

A word or phrase from the story may correspond to more than one instance of a GSP structure. For example, a single word can have a different GSP structure instance for each word sense. The word "fall" may have one instance of a GSP structure for one sense (e.g., like that found in the sentence "A big raindrop fell on Chloe's face."), a second GSP structure instance for another sense (e.g., like that found in the sentence "Chloe slipped and fell in the mud."), and a third GSP structure instance for yet another sense (e.g., like that found in the sentence, "The temperature fell ten degrees.").

Compound GSP structures may also be defined where at least one role of a structure is filled with another GSP structure. As an example, suppose there is a GSP structure for communication (e.g., roles of agent, recipient, message) and a second GSP structure for a goal (e.g., roles of agent, goal). The role of "message" in the communication GSP structure may be filled by the goal GSP structure. This forms a compound GSP structure that represents facts about communications where the message being communicated is itself about a goal of some agent. Such a compound GSP may correspond, for instance, to the natural language sentences, "Alice told Bob that Carol wanted a ticket." or, "'Pass the corn,' said Dan." The nested relationships discussed above with reference to certain structures are examples of compound GSP structures.

Figure 5:
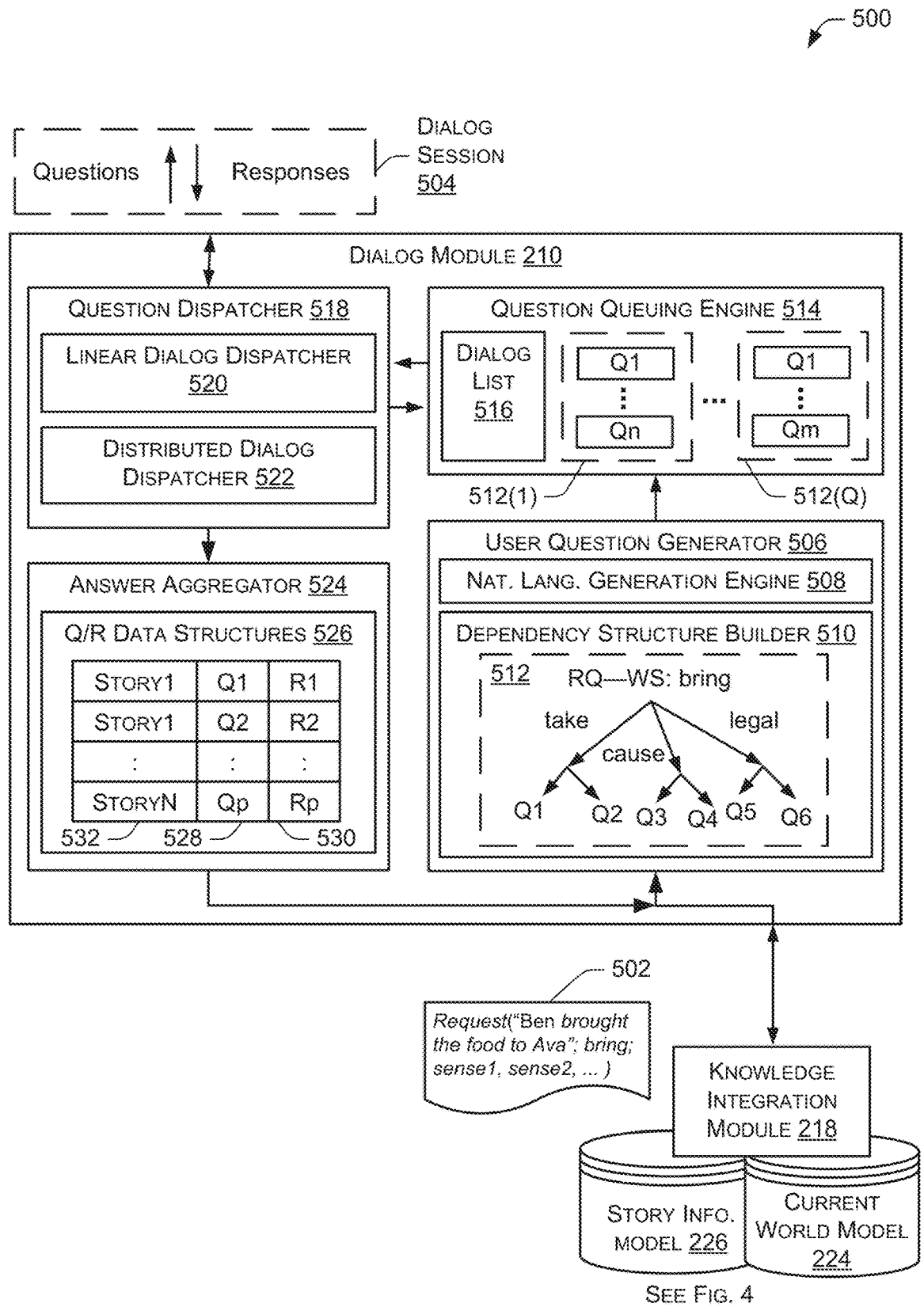
FIG. 5 is a block diagram of an example implementation of a dialog module employed in the architecture of FIG. 2.

FIG. 5 shows an exemplary implementation of the dialog module 210, illustrating select components that may be used to generate user questions to challenge and/or confirm the system's current understanding of the story, and receive user responses for revising and extending the interpretations implemented in the semantic structures and frames to modify the system's understanding. The dialog module 210 allows the device(s) 104 to engage in extended dialog sessions with individual human users. Each dialog session may be carried out as a serial linear dialog involving only one user, or in a distributed manner to distribute questions to multiple human users in parallel. Distributed dialog applies flexible dialog management in disassembling the content of a dialog session to ask questions to different users and reassembling the results to achieve essentially the same or similar learned outcome as a linear dialog. Distributed dialog sessions allow the device(s) 104 to scale by managing the cognitive load of questions across a crowd of users, thereby reducing latency of the learning process through parallelized interactions with multiple users.

Dialog interaction in the collaborative learning process may serve one of two purposes. The first is to support system learning and the second to support user learning. In the first case, the system may not adequately map a story to GSPs with sufficient confidence, or fails to make a necessary inference to fully understand the story. In these cases, the system poses questions to users to solicit the missing information to accomplish the task. Through this learning process, the system may ask additional probing questions to generalize, specialize, or confirm what it has learned to ensure correctness in future application of the knowledge. Examples of system learning strategies include solicitation, confirmation, and generalization/specialization. Solicitation is a strategy in which the dialog engine asks a user to fill in gaps to complete system understanding. For example, the system may ask, "The story says "Ben showed Ava to a table". Can you explain what "show" means in this context?". In this case, a helpful user would rephrase the sentence in simpler terms to help the system understand, such as "It means 'Ben took Ava to a table'."

Confirmation is a strategy to confirm or validate interpretations/inferences made about the story in which the system has less confidence. For example, the system may ask "'Ben took Ava to a table' means 'Ben and Ava walked and then they are both near the table'. Is that correct?" or in the Ben and Ava story, the system may confirm inferred actions such as "I think that Ava paid the bill. Is that correct?". Generalization/specialization is a strategy that attempts to ask additional probing questions to enhance the system's understanding after the system has learned some new information. For example, the system may ask "Did Ava pay the bill because she is the customer?" (yes), "Do customers always eat spaghetti?" (no) "Do customers always eat food?" (yes in a restaurant) "Do customers always pay the bill?" (yes). This additional knowledge gained from generalization and specialization helps the system apply the knowledge in appropriate circumstances in the future.

In the case of supporting user learning, the system's role is to ask questions that will help the user better understand the story or reason about it. Note that some of the questions the system asks here may be similar to what was discussed previously, with the primary difference that now the system knows the answers to those questions. Some examples strategies for user learning include compare/differentiate, generalization/specialization, and inference. The system can automatically switch between these two modes of operation depending on its reading ability relative to the user's ability.

In compare/differentiate, the dialog engine asks questions to help the user differentiate among similar cases. For example, the system may ask "'Ben showed Ava to a table' means 'Ben and Ava walked over to a table'. Can you tell me what 'Ben showed Ava a table' means?" In generalization/specialization, the system asks questions to help the user generalize/specialize their knowledge. For example, the system may ask "What else does a customer do in a restaurant that's not mentioned in the story?" or "Do all restaurants have waiters?" For an inference strategy, the system may ask questions to help users make inferences that are implicit in the story. For example, after reading that "Ava paid the bill and left Ben a good tip", the system may ask "Do you think Ava is happy with Ben's service as a waiter and why?"

With reference again to FIG. 5, the dialog module 210 receives requests 502 from the knowledge integration module 218 to resolve gaps between the story information model 226 and the current world model 224. The requests may include information about the gaps to be resolved, low confidence interpretations to be confirmed, or other aspects that can help the system better understand the current story. When there is a question about a particular word sense, for example, the request may include the word, the sentence containing the word, multiple senses that the word can have, probabilities of those senses being the correct option in the sentence, a story identity, and so forth. Consider the sentence "Ben brought the food to Ava" in the story 332. Suppose the knowledge integration module 218 wants to learn more about which word sense may be the most appropriate one for the word "brought" or its root form "bring." The request 502 may include the complete sentence, the word "bring", the various senses of "bring", and so forth.

As requests are received from the knowledge integration module 218, the dialog module 210 begins one or more dialog sessions 504 with human users (e.g., student 106, user of crowdsourcing network(s) 108, etc.). During the dialog session 504, the dialog module 210 generates and sends questions to the user devices for consideration and input by the human users and receives and processes responses entered into the user devices by the human users.

In the illustrated implementation of FIG. 5, the dialog module 210 is a set of executable components that formulate questions, based on the attempted alignment of the story information model 226 with the current world model 224, and interact with one or more human users to obtain answers to those questions. The user questions are formulated to fill or resolve gaps that arise where the system does not have sufficient confidence in the current story information model 226, is not yet able to confidently align the story information model 226 with the current world model 224, or attempts to generalize/specialize the new information to facilitate future application of the knowledge. The dialog module 210 may further leverage reading comprehension questions and/or produce new questions for the story as such questions can be useful for identifying gaps where the system's current story model plus current world model is insufficient to fully understand the story in its context.

The dialog module 210 has a user question generator 506 to formulate questions to be posed to the human user during a dialog session 504. The user question generator 506 receives requests, such as the request 502, from the knowledge integration module 218 and crafts questions to discover information relevant to the requests. In one implementation, the user question generator 506 has a natural language generation engine 508 and a dependency structure builder 510. The natural language generation engine 508 is used to render beliefs from the story model and current world model in natural language. The natural language generation engine 508 makes use of syntactic information, natural language templates associated with GSPs, and background corpora information from the knowledge integration module 218 to generate natural language that a non-expert user will be able to understand. The dependency structure builder 510 is provided to construct a dependency structure 512 from the data in the request 502. A dependency structure 512 may be used to represent a dialog in a way that allows the system to determine the parts of a dialog that are independent of one another and can be pursued in parallel. The dependency structure also allows the system to infer a dialog context for interpreting and answering a question, which is critical in a distributed dialog setting. In this structure, a root node represents a parent question and each child node branching from the root node represents a possible follow-up question based on the answer to the parent question. Using this representation, child nodes are dependent on their parent nodes while sibling nodes are independent of one another.

In the illustrated example, a root node pertains to the question of word sense (WS) of the word "bring" as received in the request 502. From this root node, three child nodes are shown for the three senses received in the request, including "take" (i.e., sense option 1: "take something or somebody with oneself somewhere"), "cause" (i.e., sense option 2: "cause to come into a particular state or condition", and "legal" (i.e., sense option 3: "present or set forth legally"). Accordingly, a root question (RQ) of the dependency structure 512 may simply be to ask which sense of the word "bring" in the sentence, "Ben brought the food to Ava", is most likely? Depending upon that answer, follow-up questions represented as questions Q1-Q6 may be asked depending upon which word sense the human user selects initially. If the user selected the "take" option, then the follow-up questions will be Q1 and Q2, and may include questions about what the state was before the action, and what the state is after the action.

Figure 6:
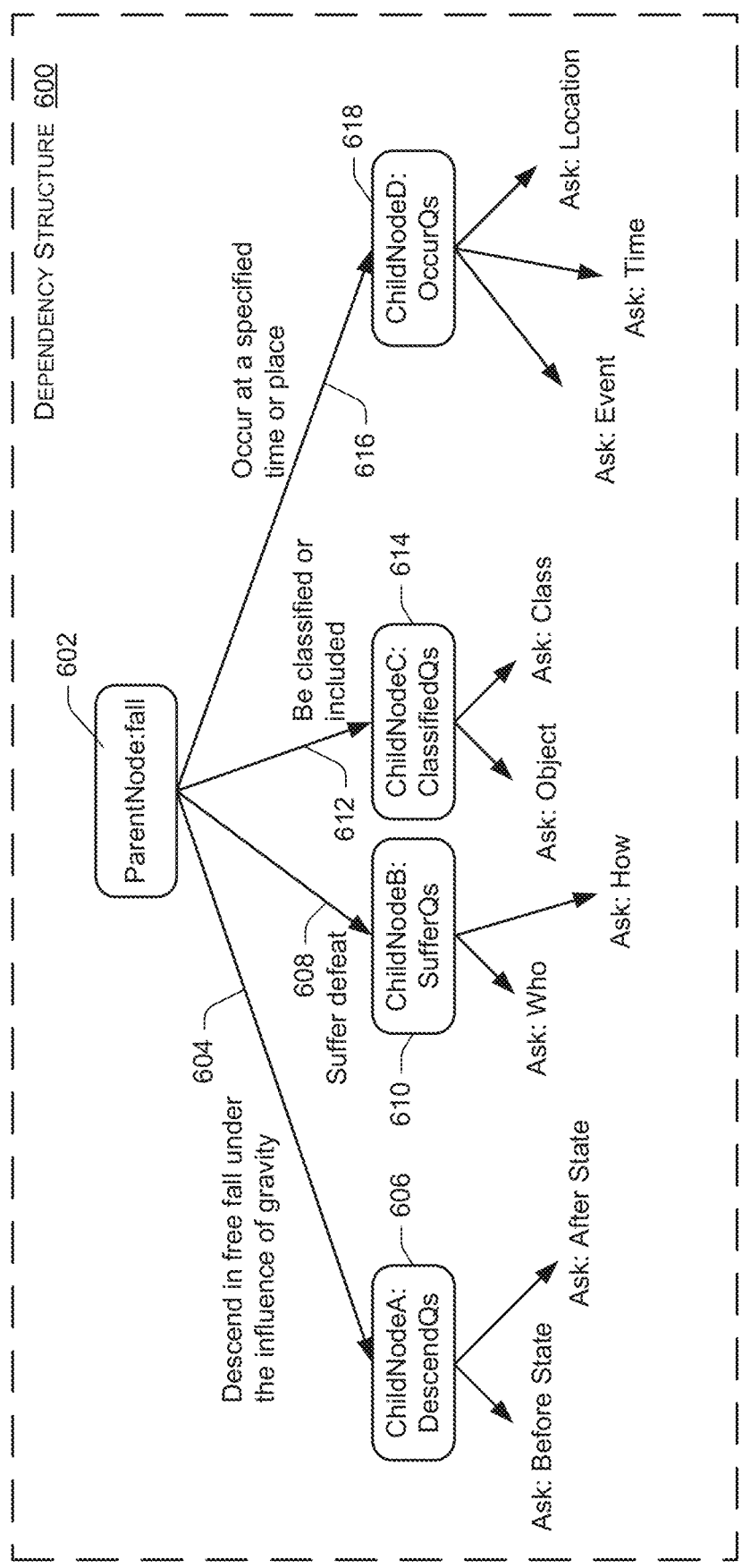
FIG. 6 shows an example of a dependency structure used by the dialog module to generate appropriate questions to pose to one or more human users.

FIG. 6 shows another example of a dependency structure 600 (like the structure 512 in FIG. 5) in more detail, but this time using the example sentence "A big raindrop fell on Chloe's face." In this example, dependency structure 600 is constructed to ask questions about the sentence itself, such as the sense of the word "fell" in the sentence. A parent node 602 contains the verb "fall", as the root form of "fell" in the sentence. Associated word senses form the possible branches from the parent node. A first branch 604 corresponds to a first sense of the word "fall", which means to "descend in free fall under the influence of gravity". The first branch 604, which represents the correct word sense for the sample sentence, leads to first child node 606 that suggests questions pertaining to possible facts or relations implicit in the corresponding word sense of free falling. Here, the first child node 606 suggests to ask questions about what happened before the raindrop fell (i.e., Ask: Before State—"Where was the raindrop before it fell?") as well as questions about what happened after the raindrop fell (i.e., Ask: After State—"Where was the raindrop after it fell?").

A second branch 608 corresponds to a second sense of the word "fall", which has a meaning to "suffer defeat". This second branch 608 leads to a second child node 610 that suggests questions pertaining to possible facts or relations implicit in the corresponding word sense of suffering defeat. The second child node 610 might suggest asking such questions like "who suffered defeat?" (i.e., Ask: Who) and "how did they suffer defeat?" (i.e., Ask: How). A third branch 612 corresponds to a third sense of the word "fall", which means to "be classified or included". A third child node 614 terminates the third branch 612 and suggests asking follow-up questions pertaining to classification, such as "what object is being classified?" (i.e., Ask: Object) and "what is the class?" (i.e., Ask: Class). A fourth branch 616 corresponds to a fourth sense of the word "fall", which means to "occur at a specified time or place". This fourth branch 616 leads to a fourth child node 618 that suggests questions pertaining to possible facts or relations implicit in the corresponding word sense of occurring at a time or place. The fourth child node 618 might suggest asking such questions like "what event took place?" (i.e., Ask: Event), or "when did it take place" (i.e., Ask: Time), or "where did it take place" (i.e., Ask: Location).

In a different scenario, the system's question to the user may not be directly related to how a single sentence should be interpreted, but rather on how the information conveyed in the sentence should be integrated into the system's understanding of the whole story. For instance, a parent node in this case may be "location of Chloe", with a corresponding question "Is Chloe indoors or outdoors?" A follow-on question after the user chooses "indoors" may be "Why is it raining indoors?" (turns out Chloe is in a rainforest in the story), while one when the user chooses "outdoors" may be "I think it is raining in the story. Is that correct?" Dependency structures can be built similarly for scenarios where the system attempts to confirm, solicit, generalize, and specialize information it learned from the story.

Accordingly, the dependency structures 600 may be constructed for each of the various requests received from the knowledge integration module 218. The dependency structures 600 provide the relationships among the various elements known to be part of the information being sought, thereby allowing the dialog engine to formulate appropriate questions to engage a human user.

With reference again to FIG. 5, the dependency structures 512 built by the dependency structure builder 510 are provided to a question queuing engine 514, which organizes the structures for the dialog sessions 504 with the users. The question queuing engine 514 is shown with multiple dependency structures 512(1)-(Q) stored in a queue, with each dependency structure having one or more questions therein, as represented by the questions Q1-Qn in structure 512(1) and questions Q1-Qm in structure 512(Q). Each dependency structure represents the system's attempt to solicit information from the user to fulfill all or part of requests such as 502. The questions may be maintained in an ordered list 516 that can be made available for presentation to the users.

The question queuing engine 514 provides the questions in its ordered list 516 to a question dispatcher 518 for submission to the human users during the dialog session 504. During the dialog session 504, the question dispatcher 518 sends the questions to the user devices 114/118. The question dispatcher 518 continuously dispatches questions from the list 516 to either a single user in a linear exchange or to multiple users in a parallel manner. The question dispatcher 518 includes a linear dialog dispatcher 520 that facilitates sessions with a single user. As one example, the linear dialog dispatcher 520 may engage with a single collaborator about the content of the Ben and Ava story. The linear dialog dispatcher 520 may formulate the first question about the sense of the word "bring" as derived from the root node of dependency structure 512. The question may be dispatched and presented on a user device UI, as follows:

Here is a sentence I'm trying to understand:
        Ben brought the food to Ava.
    What choice below uses the word "bring" most similarly to the sentence above?
    1. Take something or somebody with oneself somewhere.
    2. Cause to come into a particular state or condition.
    3. Present or set forth legally.

After this initial question, suppose the user returns the answer of option 1.

Responses received from users by the question dispatcher 518 are returned to the question queuing engine 514 for analysis of which follow up questions to ask. When the user chooses an option (e.g., word sense "take" for the verb "bring"), the question queuing engine 514 traverses the appropriate dependency structure along the branch for that chosen option to determine a new question. The new question is then added to the dialog list 516 for the question dispatcher 518 to send out to the users. Continuing with the Ben and Ava story, appropriate follow-on questions to be presented back to the same collaborator might be as follows:

Where is the food before it is brought to Ava?
    Where is the food after it is brought to Ava?

Multiple choice answers may be provided for each of these questions, if choices can be inferred, or an open dialog box may be provided for the user to simply add an answer.

The question dispatcher 518 may alternatively distribute questions in parallel to multiple users through a distributed dialog dispatcher 522. The distributed dialog dispatcher 522 separates the questions and distributes them to multiple users in parallel. The distributed dialog dispatcher 522 may ask the same question to multiple people, or different questions to different people.

Another example of follow-on questions using the sentence illustrated in FIG. 6 of "A big raindrop fell on Chloe's face" may include, for example:

Dialog Engine: What is the sense of "fall" in "A big raindrop fell on Chloe's face"? (Offers multiple choice options)
    User: Option 1-Descend under the influence of gravity
    Dialog Engine: What is the state of raindrop before "fall"?
    User: It is in the sky.
    Dialog Engine: What is the state of raindrop after "fall"?
    User: It is on Chloe's face.

The two follow-on questions pertaining to the state of the raindrop before and after the fall may be linearly dispatched to the same person by the linear dialog dispatcher 520 or dispatched in parallel to two different people by the distributed dialog dispatcher 522.

The question dispatcher 518 also sends responses from the users to an answer aggregator 524, which continuously aggregates information obtained from question/response pairs returned from the dialog session 504. The question/response pairs may be stored as data structures 526 that associate the questions asked with the responses given. In the illustrated example, the question/response data structures 526 may associate each question 528 with a response 530 to form a question/response pair, which is further associated with a story identity 532. Additional information may also be recorded, such as the user reference identity, date/time stamp, modality used, and so forth. When the dialog session 504 is completed, the aggregated information embodied in the question/response data structures 526 corresponds to the results learned from interacting with humans. The question/response data structures 526 are returned to the knowledge integration module 218 for integration into the current world model 224 and further alignment with the story information model 226.

The dialog module 210 may further compose questions that work across multiple sentences or multiple stories as the system learns more. For instance, in the Chloe example above, the dialog module 210 asked one set of questions around the sense of the word "fall" as used in the sentence "A big raindrop fell on Chloe's face." But suppose the story about Chloe has another sentence, "Chloe slipped and fell in the mud." The knowledge integration module 218 may want to examine the use of the word "fell" in this sentence, and contrast that against the use of the word "fell" in the first sentence. A dependency structure for this second Chloe sentence may be configured and the dialog engine may ask questions that engage the user in a continuing linear dialog session as follows:

Dialog Engine: Is "fall" in "Chloe slipped and fell in the mud" used in the same way as "A big raindrop fell on Chloe's face"?
User: No
Dialog Engine: What is the sense of "fall" in in "Chloe slipped and fell in the mud"? (multiple choice questions provided)
User: Lose an upright position suddenly
Dialog Engine: What is the state of Chloe before "fall"?
User: She was upright
Dialog Engine: What is the state of Chloe after "fall"?
User: She is on the ground, in the mud As the system learns and the knowledge integration engine discovers more and more relations among words/phrases, semantics, and frames, the requests to the dialog engine may become more complex. The dialog module 210 may use these requests to craft increasingly more sophisticated questions. Beyond word senses and filling in facts and relationships, the dialog module 210 may ask questions that begin to explore the completeness of frames in the story.

Accordingly, in one implementation, the dialog module 210 may be embodied as a system-initiative dialog system with multiple operational modes, ranging from a basic learning mode to acquire word and frame semantic representations to an interactive mode to read a story together with human students and ask questions when encountering difficult passages of the story, as well as other modes of interaction with complexities in between. In the learning mode, the knowledge integration module 218 and the dialog module 210 engage users to learn the basic meanings of individual words within sentences and basic frame representations. This begins with learning the most commonly used words, such as the top verbs and nouns usually known by grammar students of 6-7 years in age. These words are learned in the context of sample sentences to ensure that proper word senses are learned together with how words with those senses typically behave grammatically. The learned semantic representations for those target words then go through a generalization process to produce general semantic representations for the target words which then become the foundation for interpreting future sentences.

The learning mode may further be used to discover basic frame representations. To do this, the dialog module 210 engages human users in a discussion over what the user understands to be happening in the story, even though such understanding is not explicitly set forth. The dialog module 210 may draft general questions about the story, such as who is involved, where is the story taking place, how are the story elements unfolding or behaving, when is the story unfolding, and so forth. For instance, in the Ben and Ava story, the dialog module 210 may pose a question like, "After reading this story, can you say where Ben and Ava were?" The user may answer in a "restaurant" or "pub". The dialog engine may use this response to frame yet another question like, "How did you know it was a restaurant (or pub)?" The user may further reply, "because Ben showed Ava to a table, gave her a menu, and brought her food."

From this human interaction, the device(s) 104 can learn if one person shows a second person to a table, gives the second person a menu and brings the second person food, that means the first person and the second person are likely to be in a restaurant. The knowledge integration module 218 uses this learned information to revise and update frame representations. In some cases, the knowledge integration module 218 may leverage this user feedback to write abstract scripts or episodes by building frames that can be organized and grouped into the episodes. In one approach, an abstract frame may be built for every noun, and then multiple frames may be used within an episode.

As one more example of crafting more general questions designed to pull out higher level information for frame semantics, consider an example Enzo and Zoe story. The story is as follows:

Enzo and Zoe were running a race. Enzo fell. He hurt his knee. Zoe looked back. She was almost at the finish line. She wanted to win. If she kept running, she would win. Enzo was her friend. Zoe stopped. She ran back to Enzo. She helped him up. "Thank you," said Enzo. "You're welcome," said Zoe. "If I fell, I would want you to help me. I'm glad I could help you.

From this story, the knowledge integration module 218 may make requests to know more about what a "race" is in general. In the request, the knowledge integration module 218 may provide as much information as it knows, such as word senses for "race", any semantic structures and frames that use the term "race", and so forth. From that, the dialog module 210 generates a set of one or more questions to extract knowledge from the user. For instance, one example set of questions might include the following questions Q1, Q2, and Q3, below:

Q1: I see that this story is talking about a race. Which of these things are typically associated with a race?
a. a participant
b. a winner of the race
c. a finish line marking the end of the race These choices may be provided in the request from the knowledge integration module 218 as being known from other uses of the word "race" in other stories, frames, corporate, and the like.

Q2: Who in the story does these things?
        a. participant
        b. winner These choices may be generated from type information and the induction process of the knowledge induction engine.

Q3: Which of these actions typically happen in races?
        a. participants run a race
        b. participants want to win
        c. participants fall
        d. participants finish race by crossing finish line These choices may be generated by substituting named entities in the story with concepts/roles using information provided by user when answering the second question Q2, or by mining statistical associations from large background corpora.

Following this interaction, the system has new knowledge about a race frame such as typical agents and actions associated with it. The race frame may not be complete but it is still useful. The race frame may be further constructed and filled out as the system encounters other stories that happen to mention races.

FIGS. 7, 10, 13, and 14 are flow diagrams of illustrative processes. The example processes are described in the context of the environment of FIG. 2, but are not limited to that environment. The processes are illustrated as a collection of blocks in a logical flow graph, which represents a sequence of operations that can be implemented in hardware, software, or a combination thereof. In the context of software, the blocks represent computer-executable instructions stored on one or more computer-readable media 204 that, when executed by one or more processors 202, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 7:
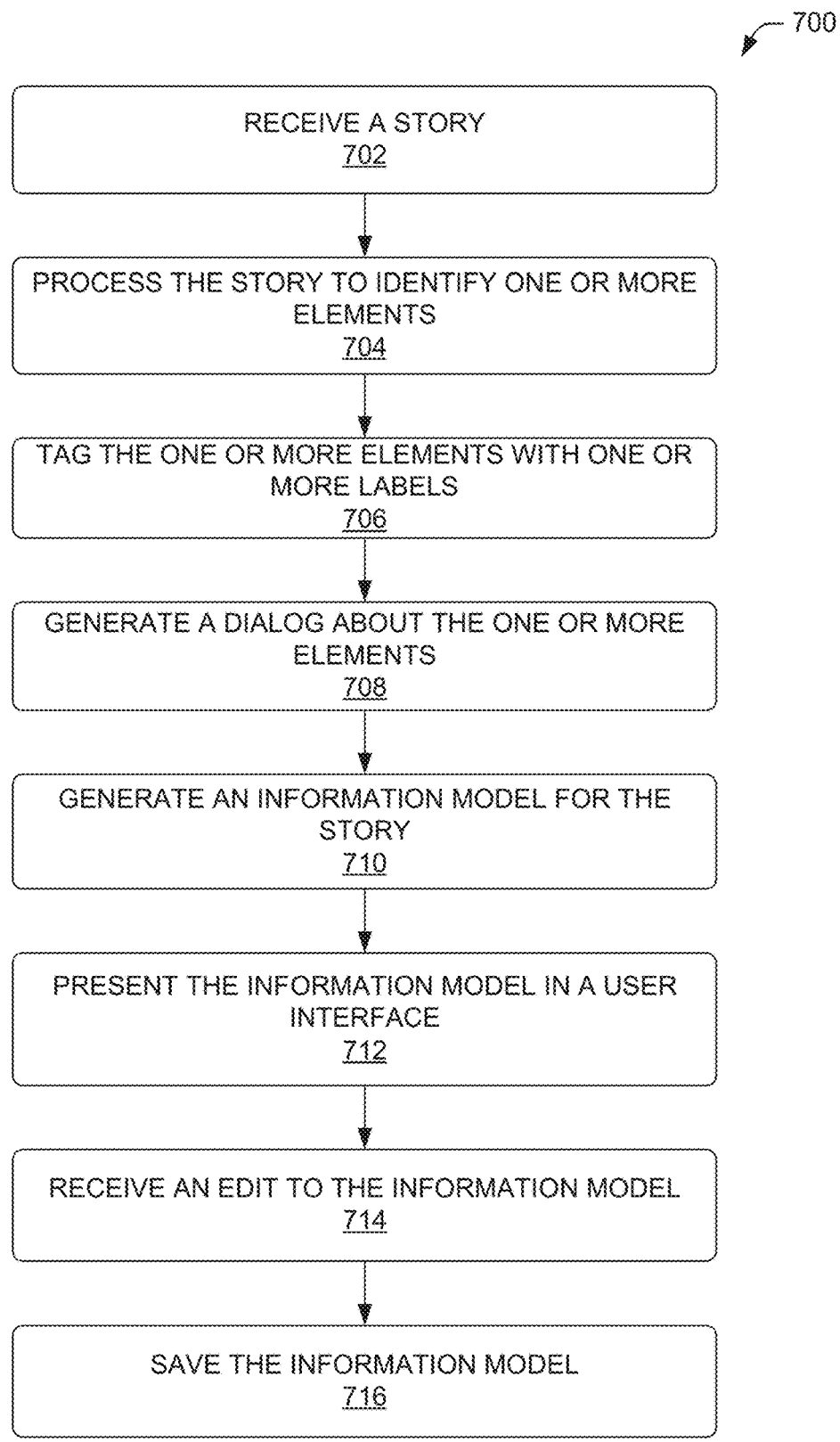
FIG. 7 is a flow diagram of an illustrative process for receiving a story from an author and processing the story to generate an information model to guide adaptable dialog.

FIG. 7 is a flow diagram of illustrative process 700 for receiving a story from the author(s) 102 and processing the story to generate an information model to guide adaptable dialog. The process 700 is described with reference to the system 100 and may be performed by the user device(s) 104 and/or in cooperation with any one or more of the content server(s) 114. Of course, the process 700 (and other processes described herein) may be performed in other similar and/or different environments.

At 702, the authoring tool module 118 may receive a story from the author(s) 102 or a user using the authoring tool. The story may be uploaded as part of a batch of stories from an educational entity and may be selected by the author to edit. In some examples, the reading comprehension module 206 may provide a batch uploader, so that the author need not have to interact with the authoring tool module 118, and may instead upload the story file via the batch uploader.

At 704, the story parsing engine 116 may process the story to identify the story elements. The story parsing engine 116 may use one or more models from the system datastores 220 including the system story models 222 to process the unedited stories to identify the elements in the story. Having identified the elements, the story parsing engine 116 may tag the elements with labels based on the element type including, but not limited to, characters, setting, object, plot, and events in the story to help generate a tagged version of the stories.

At 706, the authoring tool module 118 may tag the elements with labels. The labels may include basic non-unique label, or enumerated label based on the element types to create unique references for each new character, object, event, etc. For instance, the story parsing engine 116 may identify and label the first character in the story as "Character1," and the second character as "Character2" and so on, and similarly identify and label the events in the story. The labels may be combined as compound enumerated labels to link elements to each other. For instance, the enumerated label "Event2_Character1" may indicated that Event2 is linked to Character1.

At 708, the dialog module 210 may generate a dialog about the elements. The dialog module 210 may evolve a collection of micro-dialogs and use this collection to generate a dialog for the story. Initially, the collection of micro-dialogs may include a small collection of generic dialogs. The collection of micro-dialogs may include a list of dialog topics and subtopics. As a non-limiting example, the dialog topics may include introductions, help, setting, summary, temporal, meaning, character, events, author, idiom, conflict, theme, moral, ideas, and meta constructs. A list of subtopics for the topic "character" may include traits, relationships, thoughts, and opinions. As discussed above with respect to the story parsing engine 116, the stories may be processed and tagged with labels based on element types (e.g., characters, objects, and events, etc.) and the labels may include an enumerated value for each of the element types. The enumerated labels may be used by the dialog module 210 to generate micro-dialogs. The collection of micro-dialogs may include dialogs with fields to be completed by the enumerated labels to help generate a question. For example, some of the dialogs may include fields such as <event> or <character> to be replaced by an event or character identified in the story.

At 710, the story parsing engine 116 may generate an information model for the story. The story parsing engine 116 may generate an initial information model to store the labels and the information extract from the story. Additionally, the story parsing engine 116 may identify information that the system knows based on the labeling, such as character, object, or event counts. For instance, the information model may identify "Character1" as Alice and "Character2" as "John" and a character count as 2 based on having two identified characters. Additionally, the information model may use the labels to identify the conceptual structures of the story.

At 712, the authoring tool module 118 may present the information model in a user interface. The processed story may include a tagged and scripted version of a story for the author to verify on a user interface. Additionally, the authoring tool module 118 may allow the authors 102 to edit the tags and script, and/or add additional tags and script. For example, the author(s) 102 may enjoy writing and editing stories that have very definite points of conflict and resolution, and if the system does not have such labels, the author may add <conflict> and <resolution> as element types. As an additional example, as the stories become longer and more complicated with chapters or plots with subplots, the author may add labels for <chapter> or <subplot>. As the system train on the data with the new labels, the system story models may learn how to similarly use the new labels and process stories to include the new labels.

At 714, the authoring tool module 118 may receive an edit to the information model. The authoring tool module 118 may allow the authors 102 to edit the tags and script, and/or add additional tags and script. For example, the author(s) 102 may enjoy writing and editing stories that have very definite points of conflict and resolution, and if the system does not have such labels, the author may add <conflict> and <resolution> as story element types. As an additional example, as the stories become longer and more complicated with chapters or plots with subplots, the author may add labels for <chapter> or <subplot>. As the system train on the data with the new labels, the system story models may learn how to similarly use the new labels and process stories to include the new labels.

At 716, the authoring tool module 118 may save the information model. The authoring tool module 118 may allow the authors 102 to accept the edits made and perform a final scan for any missing information from the information model. If the system finds an information gap, the author may be prompted to provide the information or continue saving with the information gap. The saved information model may be retrieved by system to conduct dialog sessions with the student.

FIG. 8 is a schematic diagram showing an example user interface 800 for the authoring tool user interface (UI) that may be presented to the author(s) 102, who is trying to manually add dialogs. The authoring tool module 118 may cause an authoring tool UI (e.g. example user interface 800) to be presented to a user utilizing any communication channel, such as a website associated with the reading comprehension system 112, an education center portal, or an application that is associated with the reading comprehension system 112 and that resides on device(s) 104 corresponding to the user.

In various examples, the example user interface 800 may include example unedited story 802, the example tagged story 804, and the example information model 806. The example unedited story 802 provides the story text in its non-edited form for easy reading and reference as the author edits the story. The data from the example information model 806 may be collected to train the system story models 222.

The example tagged story 804 may present the processed story as tagged by basic element labels. The story parsing engine 116 may use one or more models from the system datastores 220 including the system story models 222 to process the unedited stories to identify the elements in the story. Having identified the elements, the story parsing engine 116 may tag the elements with labels based on the element type including characters, objects, and events in the story to help generate a tagged version of the stories. The labels may be enumerated based on the element types to create unique references for each new character, object, and event. Alternatively, and/or, additionally, the author may have generated all or portions of the tags manually to help provide training data.

The authoring tool module 118 may present the example information model 806 for the author to provide questions and answers. This example information model 806 may contain a fewer number of system generated dialogs based on the author preferring to provide a greater number of manual question and answer edits or based on an ongoing learning of a story model of the reading comprehension system 112. The information model may include the information that an effective reader would be expected to extract from the story with the information being linked to evidence within the story.

As a non-limiting example, the example user interface 800 may receive the example story "The Winning Shot" from the author. The system may process the story and present the example tagged story 804. The example tagged story 804 may present individual sentences with their corresponding enumerated labels. The author may be prompted to verify that that the system has tagged the elements correctly. The example information model 806 may present an information model of the story with manual edits from the author.

FIG. 9 is a schematic diagram showing an example user interface 900 for authoring tool user interface (UI) that may be presented to the author(s) 102 with the information model having pre-populated dialog generated by the system. The example user interface 900 may be presented to a user utilizing any communication channel, such as a website associated with the reading comprehension system 112, or an application that is associated with the reading comprehension system 112 and that resides on device(s) 104 corresponding to the user.

In various examples, the example user interface 900 may include the example unedited story 902, the example tagged story 904, and the example information model 906. The example unedited story 902 provides the story text in its non-edited form for easy reading and reference as the author edits the story. The data from the example tagged story 804 and the example information model 806, discussed above with reference to FIG. 8, may have been collected to train the system story models 222, and the example tagged story 904 and the example information model 906 is presenting the results of the models learning how to generate tags and dialog.

The example tagged story 904 may present the processed story as tagged by the enumerated labels. The story parsing engine 116 may use one or more models from the system datastores 220 including the system story models 222 to process the unedited stories to identify the elements in the story. Having identified the elements, the story parsing engine 116 may tag the elements with labels based on the element type including characters, objects, and events in the story to help generate a tagged version of the stories. The labels may be enumerated based on the element types to create unique references for each new character, object, and event. For instance, in the example tagged story 904, the story parsing engine 116 has identified our first character, Alice, as "Character1," and John as "Character2." The labels have been combined as compound enumerated labels to link elements to each other. For instance, the enumerated label "Event2_Character1" indicates that Event2 is linked to Character1, or Alice in this case. The story parsing engine 116 may generate an initial information model to store the enumerated labels and the information they reference. For instance, the information model may identify "Character1" as Alice and "Character2" as "John" and a character count as 2 based on having two identified characters. Additionally, the information model may use the enumerated labels to identify the conceptual structures of the story.

The authoring tool module 118 may present the example information model 906 for the author to verify and if needed, to provide additional information. Here, the example information model 906 may include a list of generated dialogs that the system determines may include the information that an effective reader would be expected to extract from the story with the information being linked to evidence within the story. The information model may use the enumerated labels to reference information tagged in the story.

As a non-limiting example, the system may be processing the example story "The Winning Shot." The system may process the story and generate the example tagged story 904. The example information model 906 may include the information extracted from the story including some suggested dialog based on enumerated labels. The information model may prepopulate the questions when the system knows the answers. However, if system does not know the answer or is uncertain of the answer, the questions may be presented for the author to help provide the answer. For instance, the system may decide to generate dialogs to discuss topics including temporal, spatial, and character based the story having tag related to these topics. Under the topic "Temporal," the system is able to determine the answers to the first two questions and provide the evidence, however, the system does not know the answer to third question. Thus, the system provides the question for the author to fill out.

Figure 10:
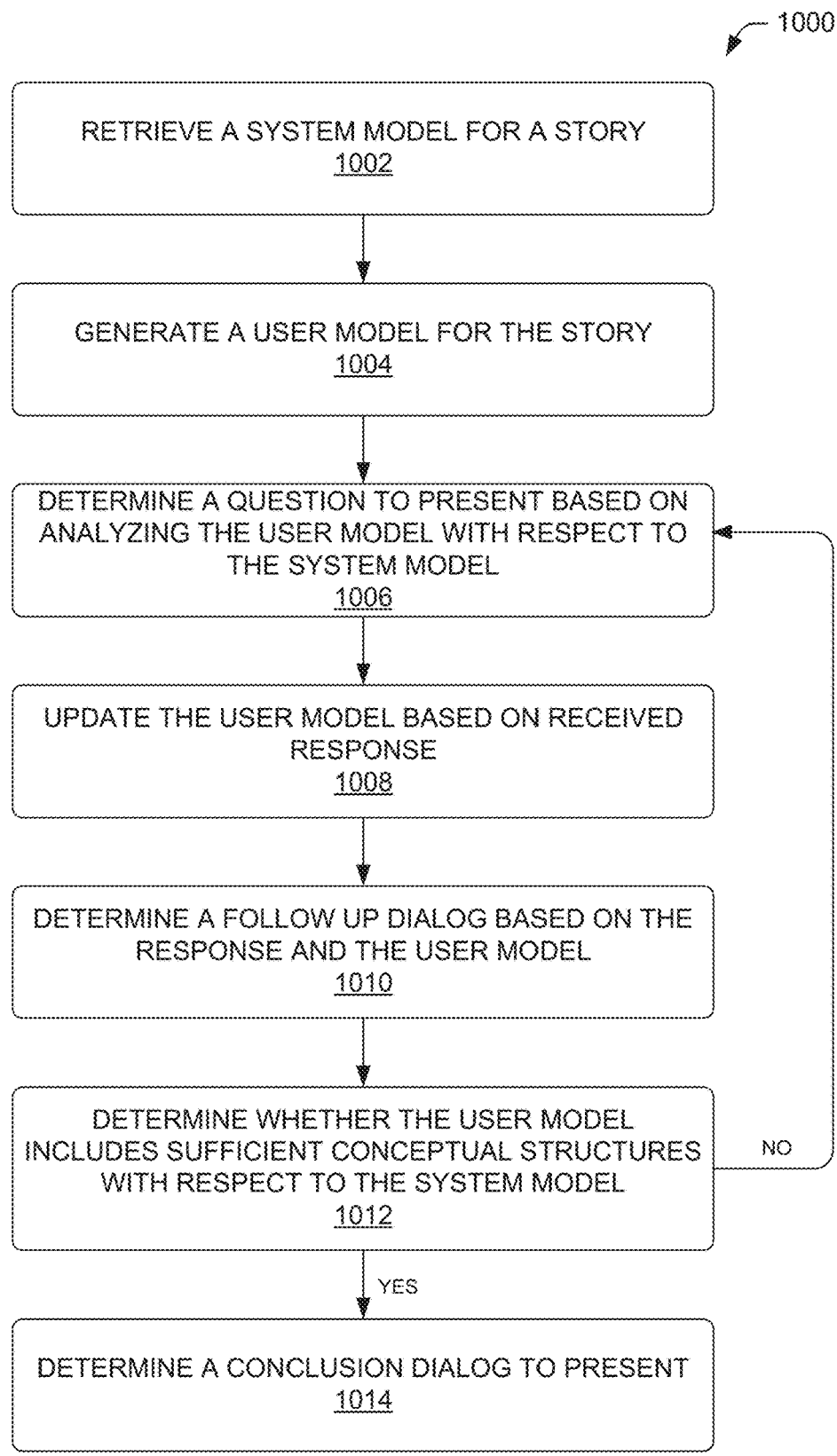
FIG. 10 is a flow diagram of an illustrative process for generating a student information model representing a student's understanding of a story and using the student information model to help guide the dialog.

FIG. 10 is a flow diagram of an illustrative process 1000 generating a student information model representing a student's understanding of a story and using the student information model to help guide the dialog. The process 1000 is described with reference to the system 100 and may be performed by the user device 104 in cooperation with any one or more of the content server(s) 114. Of course, the process 1000 (and other processes described herein) may be performed in other similar and/or different environments.

At 1002, the reading tool module 120 may retrieve a system information model for a story. The system information model for the story includes the conceptual structures that a reader should build while reading the story. Following a selection of reading comprehension lesson or story, the reading tool module 120 may retrieve the system information model for the selected story. The reading tool module 120 may use the system information model to guide the students 106 to gain a better understanding of the selected story, and to help the students 106 improve their abilities so that they might improve their skills of reading comprehension in general.

At 1004, the reading tool module 120 may generate a user information model of the story. To help determine which dialog to present, the dialog module 210 may generate a student information model to represent what the system understands as the student's understanding of the story. The dialog module 210 may use one or more dialog models and the student information model to guide the dialog while conducting a dialog session with the student. In some examples, the dialog module 210 may determine, based on the student's profile that if the student 106 is proficient at certain reading comprehension skills, to populate the student information model for that portion. In doing so, the system will skip over those section of the dialog.

At 1006, the reading tool module 120 may interact with the dialog module 210 to determine a question to present based on analyzing the user/student information model with respect to the system information model. To help determine which dialog to present, the dialog module 210 may generate a student information model to represent what the system understands as the student's current understanding of the story. The goal of the dialog module 210 and its associated model is to contain all mechanisms by which the student 106 and machine interact to bring the student's "information model" closer to the system's information model generated for the story. Thus, if the student's answer meanders to unimportant information, the dialog module 210 may gently steer the conversation back to important information. On the other hand, if the student 106 is already discussing a key concept such as the main character, the dialog module 210 may keep encouraging the same line of dialog.

At 1008, the reading tool module 120 may update the user model based on a received response. The dialog module 210 may determine based on the student's response if the student 106 is understanding the reading in relation to the question. If the student 106 answered correctly, the dialog module 210 may populate the student information model for that portion. Otherwise, the dialog module 210 may determine whether to change to a different topic or to ask the same question but to rephrase the question.

At 1010, the dialog module 210 may determine a follow up dialog based on the response and information model. Provided that the goal of the dialog module 210 is to bring the student information model closer to the system information model for the story, the dialog module 210 may analyze the student information model with respect to the system information and determine what information in the student's model is still lacking.

At 1012, the dialog module 210) may determine whether the user model includes sufficient conceptual structures with respect to the information model. As discussed above at 1006, the goal of the dialog module 210 and its associated model is to contain all mechanisms by which the student 106 and machine interact to bring the student's "information model" closer to the system's information model for the story. Accordingly, if the system determines that the student information model is sufficiently close to the system information model, that is, when the student information model analyzed with respect to the system information model, demonstrates a higher than a predetermined threshold of likeness, then the system may determine that the student 106 has an adequate understanding of the story. Otherwise, the system may return to process 1006 to continue the dialog session.

At 1014, the dialog module 210 may determine a conclusion dialog to present.

This student information model may be saved for future reference. The assessment module 212 may determine if the student 106 should work on additional skills.

Figure 11:
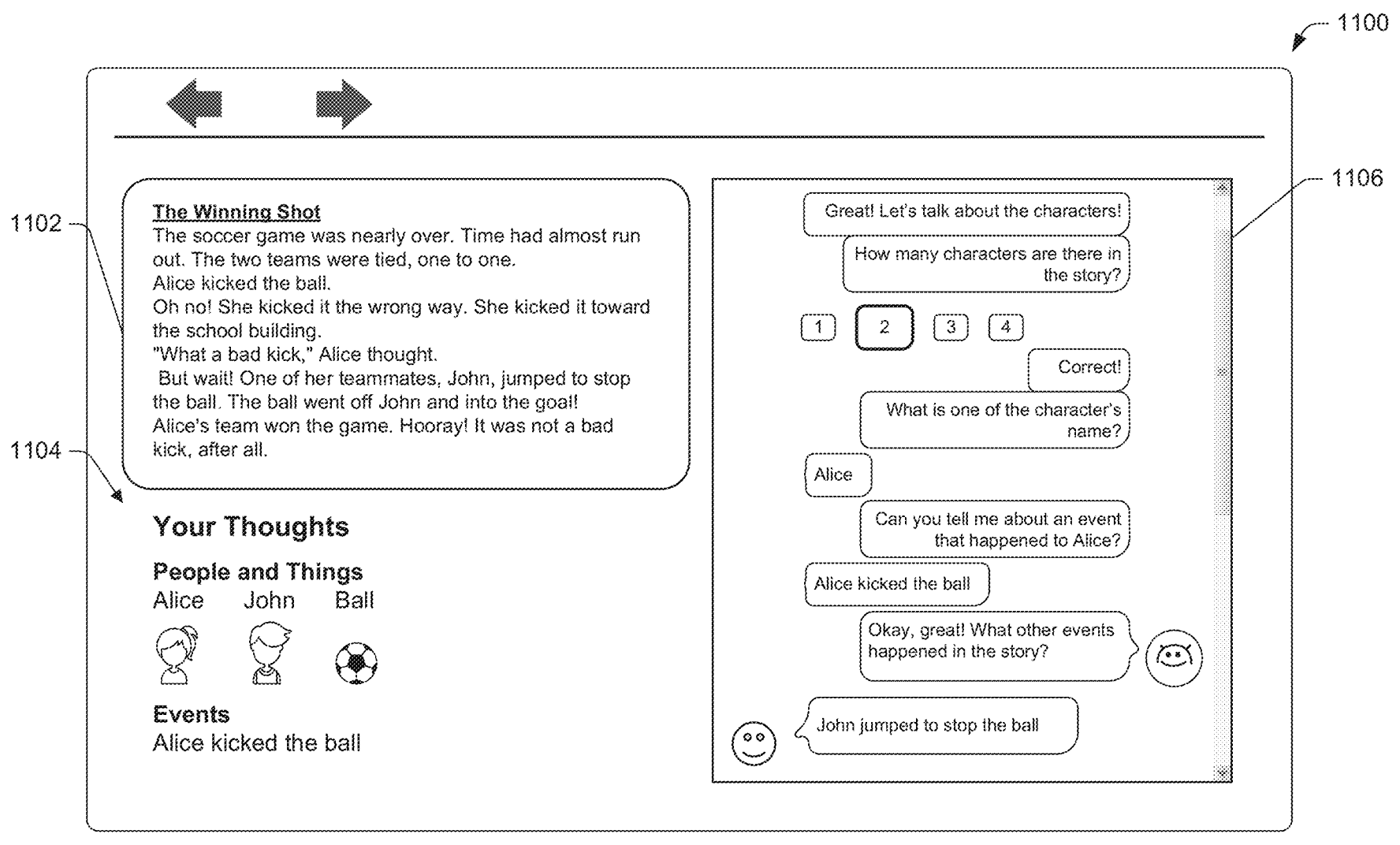

FIG. 11 is a schematic diagram showing an example user interface 1100 for the reading tool user interface (UI) that may be presented to a student 106 with adaptable dialog from the system. The example user interface 1100 may be presented to a user utilizing any communication channel, such as a website associated with the reading comprehension system 112, an application that is associated with the reading comprehension system 112 and that resides on device(s) 104 corresponding to the user.

In various examples, the example user interface 1100 may include the example story: 1102, the example student information model 1104, and the example dialog session 1106. The example story 1102 may present the story or reading lesson.

The reading tool module 120 may interact with the visual aid module 208 to present the example student information model 1104. The example student information model 1104 may include visual elements to illustrate the student information model for the story. As previously discussed, a student information model is the system's determination of the student's understanding of the story. As such, as the student 106 responds to questions correctly, the system may propagate the student information model in recognition of the student's understanding.

As a non-limiting example, based at least in part on the example dialog session 1106 between the system and a student, the reading tool UI may present different visual elements and text to help highlight the key concepts discussed in dialog. Initially, the example user interface 1100 may provide the example story 1102 and prompt the student 106 to read it. After the student 106 confirms reading the story, the system may initiate dialog about the story. As the student 106 responds, the system may provide illustration to help enforce the student's understanding. For instance, the example student information model 1104 may initially not contain any illustration, but when the student 106 responds correctly with "Alice," the example student information model 1104 may present the first illustration. By highlighting the key concepts with imagery and/or text as the students 106 talk about them correctly, the system may better engage and encourage the student.

Figure 12:
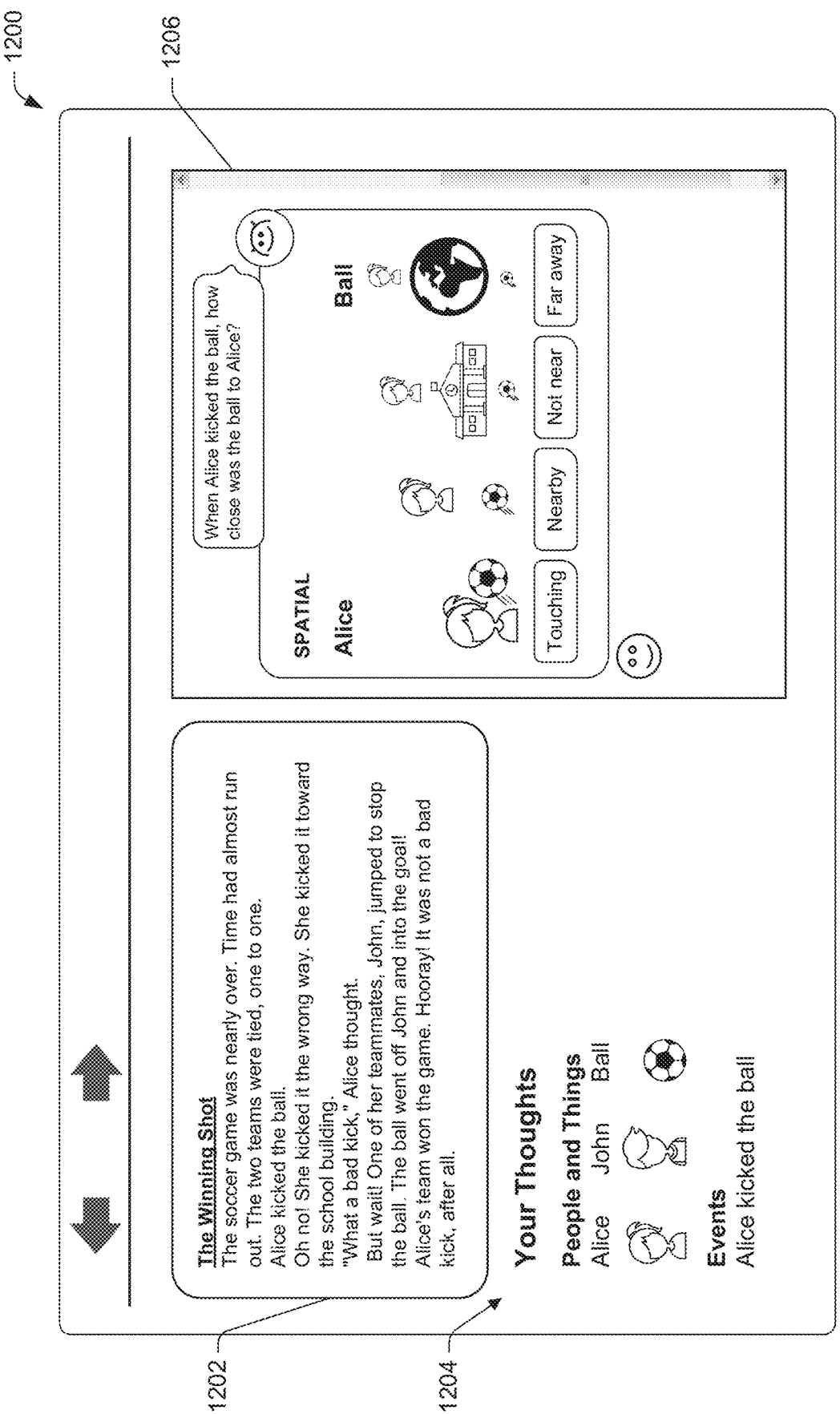
FIG. 12 is a schematic diagram showing an example reading tool user interface that presents an illustration to help comprehension skills of a student.

FIG. 12 is a schematic diagram showing an example user interface 1200 for the reading tool user interface (UI) that may illustrate the system presenting an illustration to help the student 106 understand a point. The example user interface 1200 may be presented to a user utilizing any communication channel, such as a website associated with the reading comprehension system 112, an application that is associated with the reading comprehension system 112 and that resides on device(s) 104 corresponding to the user.

In various embodiments, the example user interface 1200 may include the example story 1202, example student information model 1204, and the example illustrated dialog 1206. The example story 1202 may present the story or reading lesson.

The reading tool module 120 may interact with the visual aid module 208 to present the example student information model 1204 to illustrate the current state of the student information model for the story. Additionally, the reading tool module 120 may also present the example illustrated dialog 1206 to help illustrate a spatial question.

Figure 13:
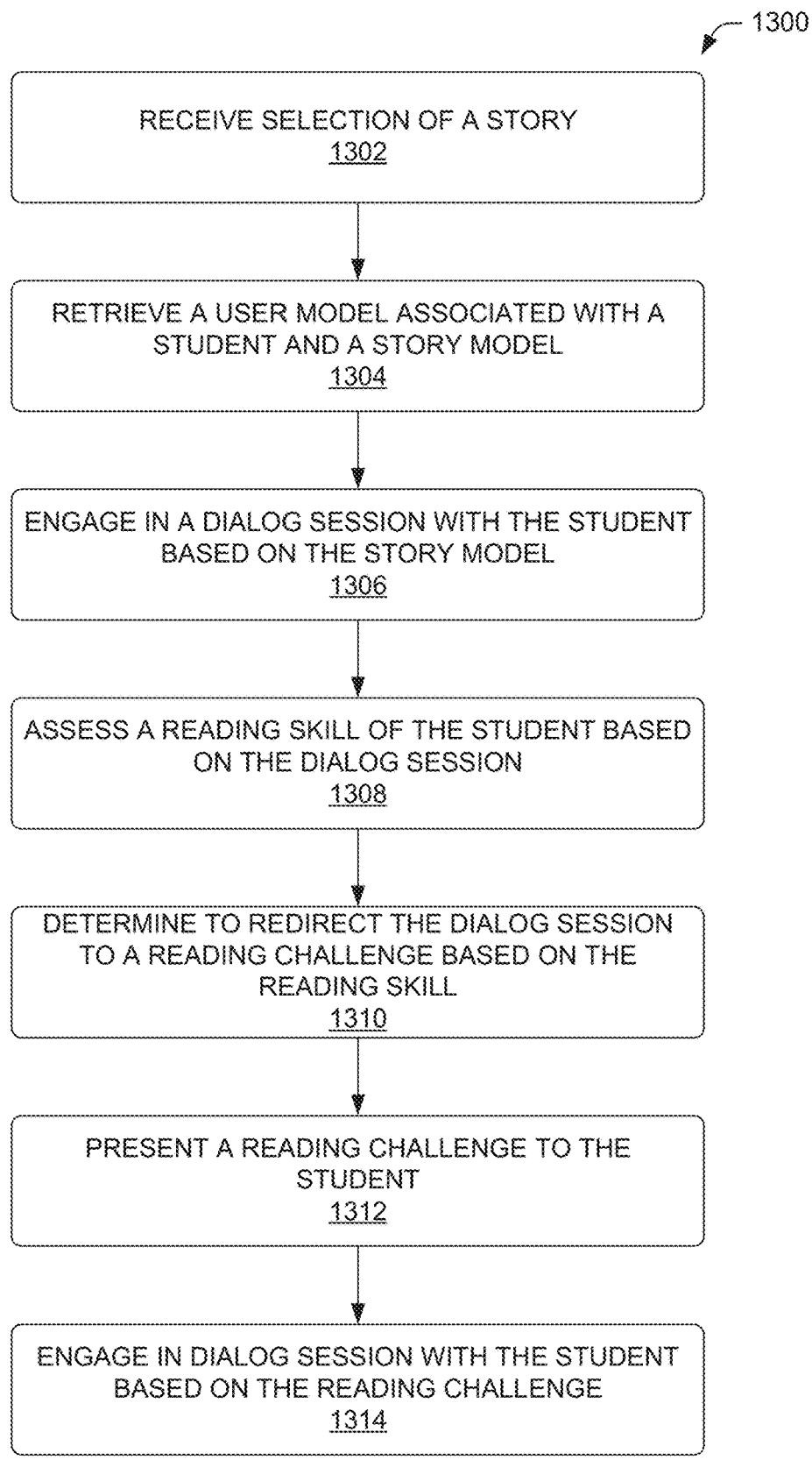
FIG. 13 is a flow diagram of an illustrative process for creating reading goals for a student.

FIG. 13 is a flow diagram of an illustrative process 1300 for the system assessing the student 106 and creating reading goals. The process 1300 is described with reference to the system 100 and may be performed by the user device 104 in cooperation with any one or more of the content server(s) 114. Of course, the process 1300 (and other processes described herein) may be performed in other similar and/or different environments.

At 1302, the reading tool module 120 may receive a selection of a story from a user. The user or student 106 may be interacting with the reading system via a user device.

At 1304, the reading tool module 120 may retrieve a user model of a student 106 and an information model for a story. The system may also generate a student information model to identify what the system determines as the student's understanding of the story. The user model for the student 106 may include information about the student 106 in general, such as likes and dislikes, and about the reading skills of the student, including the strong and weak areas. The information model for the story includes the conceptual structures that an effective reader should build while reading the story. Following a selection of reading comprehension lesson or story, the reading tool module 120 may retrieve the information model for the selected story. The reading tool module 120 may use the information model to guide the students 106 to gain a better understanding of the selected story, and to help the students 106 improve their abilities so that they might improve their skills of reading comprehension in general.

At 1306, the reading tool module 120 may interact with dialog module 210 to engage in a dialog session with the student 106 using the information model for the story. The reading tool module 120 may also interact with the assessment module 212 to constantly evaluate the student 106 using the student user model. The dialog module 210 may determine a question to present based on analyzing the user model with respect to the information model. That is, by analyzing the student user model, the system may identify a particular reading concept that the student 106 has struggled with in the past. The dialog module 210 may decide to ask questions testing that particular reading concept while using the information model as dialog map.

At 1308, the reading tool module 120 may assess the reading skill of the student 106 based on the dialog session. The dialog module 210 may determine based on the student's response if the student 106 understood the reading in relation to the question. If the student 106 answered correctly, the dialog module 210 may populate the student information model for that portion. Otherwise, the assessment module 212 may determine whether the student 106 needs to stop working on general reading skills and work on specific problem areas instead.

At 1310, the dialog module 210 may determine to change dialog session to a reading challenge based on the reading skill. The assessment module 212 may determine that the student 106 needs to stop working on general reading skills and work on specific problem areas instead.

At 1312, the dialog module 210 may present a reading challenge to the student. The assessment module 212 may interact with the challenges module 214 to determine a particular reading challenge to help the student 106 develop skills in a problem area. The assessment module 212 may identify an area of interest for the student 106 based on the student user model and attempt to find a reading lesson that relates to the area of interest.

At 1314, the dialog module 210 may engage in a dialog session with the student 106 based on the reading challenge. The dialog module 210 may work with the student 106 in a problem area to try to get the student 106 to reach a sub-goal established by the reading challenge. If the system is confident that the student 106 has developed the reading skill needed to move on, the dialog module 210 may steer the conversation back to main goal.

Figure 14:
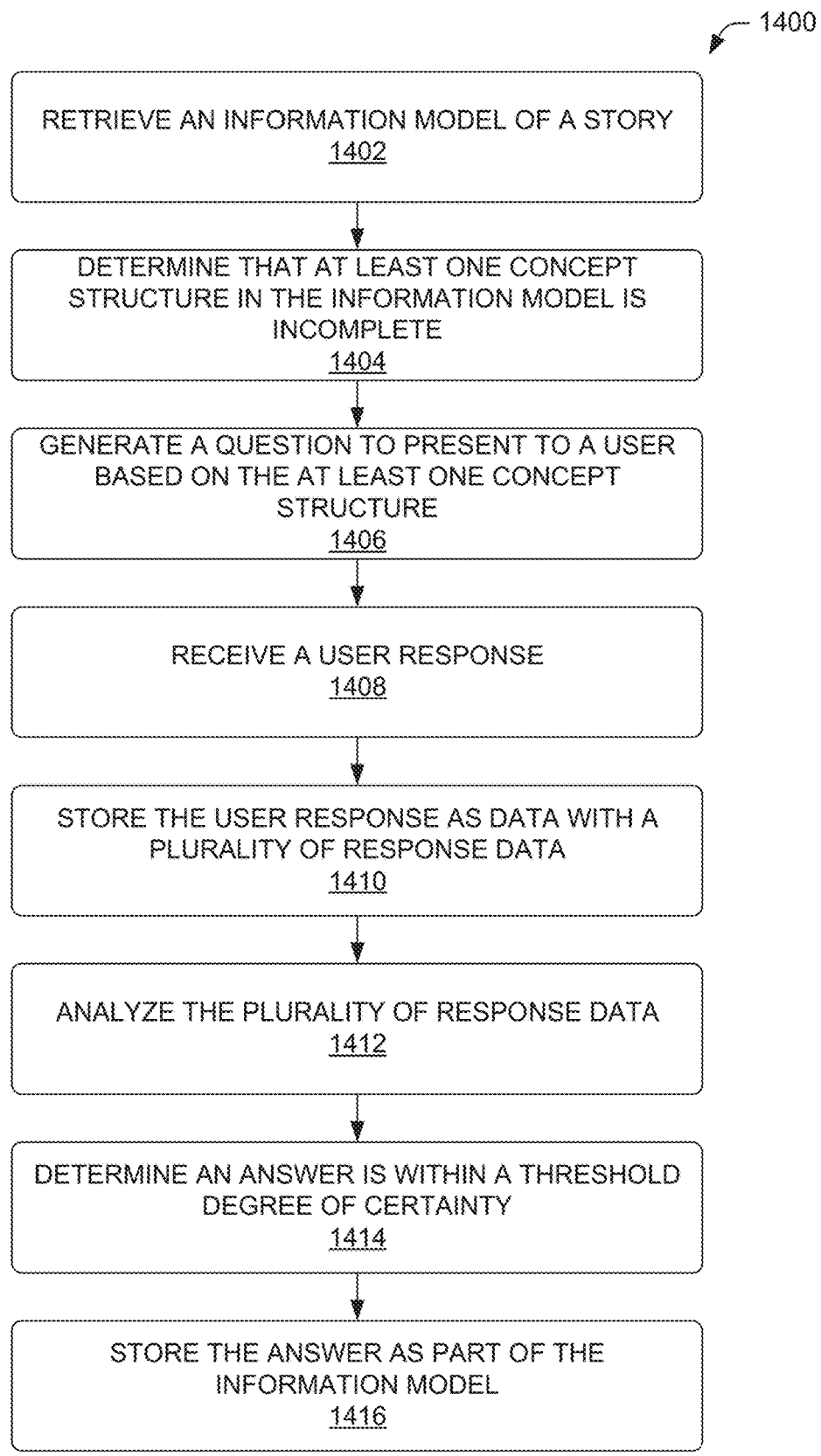
FIG. 14 is a flow diagram of an illustrative process for determining a gap in knowledge in an information model of a story and generating questions for students to help fill that gap.

FIG. 14 is a flow diagram of an illustrative process 1400 for the system determining that there is a gap in knowledge in the information model of a story and generating questions for students 106 to help fill that gap. The process 1400 is described with reference to the system 100 and may be performed by the user device 104 in cooperation with any one or more of the content server(s) 114. Of course, the process 1400 (and other processes described herein) may be performed in other similar and/or different environments.

At 1402, the reading tool module 120 may retrieve an information model for a story. The information model for the story includes the conceptual structures that an effective reader should build while reading the story. However, in many cases, not all the conceptual structures are there, or at least not the entirety of it. That is, when a story is first processed to generate an information model, the parsing engine may identify the information gap and mark it to be answered by either the author or student.

At 1404, the reading tool module 120 may determine that at least one concept structure is incomplete in the information model. Initially, the system learning module 216 may assess the information model for the story and determine if the information model is incomplete. That is, the information model may have identified conceptual structures that should be built for an understanding of the story, and that parts of the structure may be missing leaving an information gap in the model.

At 1406, the reading tool module 120 may interact with the system learning module 216 to generate a question to present to a user based on the incomplete concept structure. If an incomplete concept structure exists, such that the system learning module 216 determines there remains information that could be extracted from the story, the system learning module 216 may analyze the information gap and generate a question to ask the student. In various examples, the system learning module 216 may present the question only to students 106 that have demonstrated an understanding of the story. In another example, the system learning module 216 may present the question to all students 106 and rely on the data analysis to help filter out the incorrect answers.

At 1408, the system learning module 216 may receive a user response. The response may be received via a user device. The user device may be any device 104 as previously discussed.

At 1410, the system learning module 216 may store the user response as data with a plurality of user responses data. In at least one example, the system learning module 216 may gather all the response data but may discard some data received from students 106 with low overall reading comprehension scores. That is, the system learning module 216 may receive the user response, and before storing the data, the system may look at the student user model to determine if the student 106 is performing below a predetermined threshold for reading comprehension. If so, the system learning module 216 may choose to discard that student's answer.

At 1412, the system learning module 216 may analyze the plurality of response data. The students 106' answers may be collected and stored as possible answer data until a predetermined minimum number of sample answers have been gathered. Based on having at least the minimum number of sample answers, the answer data may be analyzed (e.g., clustering analysis) and the outlier answers may be discarded.

At 1414, the system learning module 216 may determine an answer is within a threshold degree of certainty. The system may determine, based on the analysis, if the system is statistically confident that resulting answer is correct. That is, based on the analysis used, the statistical analysis of the answer may yield a degree of certainty. The system compares the resulting degree of certainty against a predetermined degree of certainty threshold to determine the system's confidence in the answer.

At 1416, the system learning module 216 may store the answer as part of the information model. As previously stated, the system learning module 216 may analyze whether the system is confident in the answer. In some examples, the information may store the answer but mark the confidence score for answer, so that the author(s) 102 or another user may verify if the answer is correct.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
    receiving, from a first device associated with a first user, a story, wherein the first user is associated with an author account for a reading comprehension tool;
    processing, by the reading comprehension tool, the story to identify one or more elements in the story, the one or more elements including at least one of a character, an event, or a setting associated with the story;
    generating, by an authoring tool component associated with the reading comprehension tool, a tagged story model by tagging individual elements of the one or more elements with one or more labels;
    generating, by the authoring tool component and based at least in part on the tagged story model, an adaptable dialog set associated with the one or more elements, wherein the adaptable dialog set includes one or more questions for evaluating reading comprehension level;
    determining, based at least in part on the one or more labels in the tagged story model, at least one answer for the one or more questions;
    generating an information model of the story that includes at least a portion of the tagged story model and the adaptable dialog set;
    presenting, via a user interface presented on the first device, the information model for verification;
    receiving, from the first device, user input indicating approval of the information model;
    storing the information model; and
    engaging, by a reading tool component associated with the reading comprehension tool, in a dialog session with a second user associated with a student account, wherein the dialog session uses the information model to evaluate the reading comprehension level of the second user.

2. The computer-implemented method as recited in claim 1, further comprising engaging in the dialog session with the second user using the adaptable dialog set to evaluate a user understanding of the story based at least in part on the information model.

3. The computer-implemented method as recited in claim 2, wherein engaging in the dialog session comprises:
    selecting a first dialog from the adaptable dialog set;
    presenting the first dialog;
    receiving a response; and
    analyzing the response to select a second dialog.

4. The computer-implemented method as recited in claim 1, wherein the one or more labels include an enumerated value that increments based at least in part on element type.

5. The computer-implemented method as recited in claim 1, wherein the adaptable dialog set includes one or more dialogs related to the one or more elements.

6. The computer-implemented method as recited in claim 1, wherein generating the adaptable dialog set comprises:
    retrieving a collection of dialogs; and
    selecting a dialog from the collection of dialogs that has an element field that includes an element type associated with the one or more labels.

7. The computer-implemented method as recited in claim 6, wherein determining the at least one answer is further based at least in part on replacing the element field with information tagged by the one or more labels.

8. The computer-implemented method as recited in claim 1, wherein generating the adaptable dialog set comprises:
    retrieving a collection of dialogs;
    identifying a first dialog from the collection of dialogs that has an element field that includes an element type associated with the one or more labels, wherein the first dialog includes a first question template; and determining a first answer to the first question template is based at least in part on replacing the element field with information tagged by the one or more labels.

9. The computer-implemented method as recited in claim 8, further comprising:

identifying a second dialog including a second question template from the collection of dialogs; and determining a second answer for the second question template based at least in part by analyzing the information tagged by the one or more labels.

10. The computer-implemented method as recited in claim 1, further comprising training one or more machine learning models to process the story.

11. A system comprising:

one or more processors; and programming instructions configured to be executed by the one or more processors to perform operations including:

receiving, from a first device associated with a first user, a story, wherein the first user is associated with a first account for a reading comprehension tool;

processing, by the reading comprehension tool, the story to identify one or more elements in the story, the one or more elements including at least one of a character, an event, or a setting associated with the story;

generating, by an authoring tool component associated with the reading comprehension tool, a tagged story model by tagging individual elements of the one or more elements with one or more labels;

generating, based at least in part on the tagged story model, an adaptable dialog set associated with the one or more elements, wherein the adaptable dialog set includes one or more questions for evaluating reading comprehension level;

determining, based at least in part on the one or more labels in the tagged story model, at least one answer for the one or more questions;

generating an information model of the story that includes at least a portion of the tagged story model and the adaptable dialog set; and engaging, by a reading tool component associated with the reading comprehension tool, in a dialog session with a second user associated with a second account, wherein the dialog session uses the information model to evaluate the reading comprehension level of the second user.

12. The system as recited in claim 11, the operations further comprising:

presenting, via a user interface presented on the first device, the information model for verification;

receiving, from the first device, user input indicating approval of the information model; and storing the information model.

13. The system as recited in claim 11, the operations further comprising:

presenting, via a user interface presented on the first device, the information model including the portion of the tagged story model;

receiving user input to tag an element of the one or more elements with a new label;

determining, based at least in part on the new label, an additional answer for the one or more questions; and processing the tagged story model to generate a second learning model based at least in part on the new label.

14. The system as recited in claim 13, the operations further comprising:

receiving a second story;

processing the second story to identify one or more second elements in the second story based at least in part on the second learning model; and tagging at least one element of the one or more second elements with the new label to generate a tagged second story based at least in part on the second learning model.

15. The system as recited in claim 14, the operations further comprising:

presenting, via the user interface, the tagged second story; and receiving additional user input to add a dialog to the tagged second story.

16. The system as recited in claim 15, the operations further comprising processing the tagged second story to generate a third learning model based at least in part on the dialog.

17. One or more non-transitory computer-readable media storing computer executable instructions that, when executed, cause one or more processors to perform operations comprising:

receiving, from a first device associated with a first user, a story, wherein the first user is associated with a first account for a reading comprehension tool;

processing, by the reading comprehension tool, the story to identify one or more elements in the story, the one or more elements including at least one of a character, an event, or a setting associated with the story;

generating, by an authoring tool component associated with the reading comprehension tool, a tagged story model by tagging individual elements of the one or more elements with one or more labels;

generating, by the authoring tool component and based at least in part on the tagged story model, an adaptable dialog set associated with the one or more elements, wherein the adaptable dialog set includes one or more questions for evaluating reading comprehension level;

determining, based at least in part on the one or more labels in the tagged story model, at least one answer for the one or more questions;

generating an information model of the story that includes at least a portion of the tagged story model and the adaptable dialog set; and engaging, by a reading tool component associated with the reading comprehension tool, in a dialog session with a second user associated with a second account, wherein the dialog session uses the information model to evaluate the reading comprehension level of the second user.

18. The one or more non-transitory computer-readable media of claim 17, the operations further comprising:

presenting, via a user interface presented on the first device, the information model for modification;

receiving, from the first device, user input for adding a new dialog to the adaptable dialog set; and storing the information model.

19. The one or more non-transitory computer-readable media of claim 18, wherein generating the adaptable dialog set comprises:

retrieving a collection of dialogs;

identifying a dialog from the collection of dialogs that has an element field including an element type associated with the one or more labels; and replacing the element field with information tagged by the one or more labels.

20. The one or more non-transitory computer-readable media of claim 19, wherein the user input includes adding a new label, and further comprising:
   identifying a second dialog from the collection of dialogs that is associated with the element type associated with the new label; and
   prompting for additional user input to add the second dialog.

* * * * *